US011373417B2

(12) United States Patent
Machii et al.

(10) Patent No.: US 11,373,417 B2
(45) Date of Patent: Jun. 28, 2022

(54) SECTION LINE RECOGNITION DEVICE

(71) Applicant: Clarion Co., Ltd., Saitama (JP)

(72) Inventors: Kimiyoshi Machii, Tokyo (JP); Takehito Ogata, Tokyo (JP); Junya Nakamura, Saitama (JP); Naoki Shimizu, Saitama (JP); Ayano Enomoto, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/349,323

(22) PCT Filed: Sep. 6, 2017

(86) PCT No.: PCT/JP2017/032174
§ 371 (c)(1),
(2) Date: May 13, 2019

(87) PCT Pub. No.: WO2018/109999
PCT Pub. Date: Jun. 21, 2018

(65) Prior Publication Data
US 2020/0193174 A1 Jun. 18, 2020

(30) Foreign Application Priority Data
Dec. 16, 2016 (JP) .............................. JP2016-244281

(51) Int. Cl.
*G06V 20/56* (2022.01)
*G06V 10/44* (2022.01)
(52) U.S. Cl.
CPC ............ *G06V 20/588* (2022.01); *G06V 10/44* (2022.01)
(58) Field of Classification Search
CPC ..... G06K 2009/00939; G06K 9/00845; G06K 9/00536; G06K 9/00892; G06K 9/00906;
(Continued)

(56) References Cited

U.S. PATENT DOCUMENTS

2009/0059242 A1* 3/2009 Fujieda ................. G06T 7/0006
702/155
2012/0162407 A1   6/2012 Katoh et al.
(Continued)

FOREIGN PATENT DOCUMENTS

JP   2002-092796 A   3/2002
JP   2007-052730 A   3/2007
(Continued)

OTHER PUBLICATIONS

International Search Report with English translation and Written Opinion issued in corresponding application No. PCT/JP2017/032174 dated Nov. 28, 2017.
(Continued)

*Primary Examiner* — Ajibola A Akinyemi
(74) *Attorney, Agent, or Firm* — Foley & Lardner LLP

(57) ABSTRACT

A section line recognition device is realized which can determine a line type of a section line in a road surface with high accuracy. In step 301, a feature amount is extracted from an image captured by each camera. This step corresponds to a process of a feature point extraction unit. In the next step 302, the extracted feature amount is transformed into bird's-eye view coordinates which is common coordinates. This step corresponds to a process of a coordinates transformation unit. Next, in step 303, a camera to be selected is determined. This step is a process of a camera determination unit. Next, in step 304, the state transition at the appearance position of the feature point on the bird's-eye view coordinates is determined using feature point coordinates of the camera selected in step 303. This step is a process of a state transition determination unit. Finally, in step 305, the line type is determined. This step is a process of a line type determination unit.

13 Claims, 22 Drawing Sheets

(58) Field of Classification Search
CPC ............. G06K 9/6267; G06K 9/00255; G06K 9/00268; G06K 9/00355; G06K 9/00832; G06K 9/00838; G06K 9/00221; G06K 9/00288; G06K 9/00335; G06K 9/00798; G06K 9/00791; G06K 9/00228; G06K 9/0061; G06K 9/00805; G06K 9/00825
USPC ......................................................... 382/103
See application file for complete search history.

(56) References Cited

U.S. PATENT DOCUMENTS

| | | |
|---|---|---|
| 2015/0281594 A1 | 10/2015 | Sakaniwa et al. |
| 2015/0375784 A1* | 12/2015 | Ogawa ....................... G06T 7/13 701/41 |
| 2016/0004144 A1* | 1/2016 | Laroia .................. H04N 5/2171 348/222.1 |
| 2016/0127657 A1* | 5/2016 | Mukai ..................... G06T 7/292 348/218.1 |
| 2017/0043772 A1* | 2/2017 | Watanabe ............. B60W 30/12 |
| 2017/0116461 A1* | 4/2017 | Kakita ............... G06K 9/00671 |

FOREIGN PATENT DOCUMENTS

| | | |
|---|---|---|
| JP | 2008-102684 A | 5/2008 |
| JP | 2012-141691 A | 7/2012 |
| JP | 2013-003634 A | 1/2013 |
| JP | 2014-090349 A | 5/2014 |
| JP | 2014-115793 A | 6/2014 |

OTHER PUBLICATIONS

Extended European Search Report issued in corresponding European Application No. 17880173.4 dated Aug. 7, 2020.
Somasundaram et al, "Lane Change Detection and Tracking for a Safe-Lane Approach in Real Time Vision Based Navigation Systems", CCSEA 2011, Computer Science & Information Technology (CS & IT) 02, Jan. 1, 2011, pp. 345-361.
Office Action issued in corresponding European Application No. 17880173.4 dated Apr. 25, 2022.

* cited by examiner

|   | ① | ② | ③ | ④ | ⑤ | ⑥ |
|---|---|---|---|---|---|---|
| ① | — | −40 | 28 | 60 | −40 | 59 |
| ② | −40 | — | −42 | −10 | −110 | −11 |
| ③ | 28 | −42 | — | 59 | −38 | 59 |
| ④ | 60 | −10 | 59 | — | −70 | 29 |
| ⑤ | −40 | −110 | −38 | −70 | — | −39 |
| ⑥ | 59 | −11 | 59 | 29 | −39 | — |

|   | ① | ② | ③ | ④ | ⑤ | ⑥ | TOTAL |
|---|---|---|---|---|---|---|---|
| ① | — | -40 | 28 | 60 | -40 | 59 | 67 |
| ② | -40 | — | -42 | -10 | -110 | -11 | -213 |
| ③ | 28 | -42 | — | 59 | -38 | 59 | 66 |
| ④ | 60 | -10 | 59 | — | -70 | 29 | 68 |
| ⑤ | -40 | -110 | -38 | -70 | — | -39 | -297 |
| ⑥ | 59 | -11 | 59 | 29 | -39 | — | 97 |

1202

|   | ① | ② | ③ | ④ | ⑤ | ⑥ | TOTAL |
|---|---|---|---|---|---|---|---|
| ① | — | -40 | 28 | 60 | -40 | 59 | 107 |
| ② | -40 | — | -42 | -10 | -110 | -11 | -103 |
| ③ | 28 | -42 | — | 59 | -38 | 59 | 104 |
| ④ | 60 | -10 | 59 | — | -70 | 29 | 138 |
| ⑤ | -40 | -110 | -38 | -70 | — | -39 | -297 |
| ⑥ | 59 | -11 | 59 | 29 | -39 | — | 136 |

1203

|   | ① | ② | ③ | ④ | ⑤ | ⑥ | TOTAL |
|---|---|---|---|---|---|---|---|
| ① | — | -40 | 28 | 60 | -40 | 59 | 147 |
| ② | -40 | — | -42 | -10 | -110 | -11 | -103 |
| ③ | 28 | -42 | — | 59 | -38 | 59 | 146 |
| ④ | 60 | -10 | 59 | — | -70 | 29 | 148 |
| ⑤ | -40 | -110 | -38 | -70 | — | -39 | -297 |
| ⑥ | 59 | -11 | 59 | 29 | -39 | — | 147 |

| ROAD TYPE | WIDTH [m] | BROKEN LINE INTERVAL (SOLID LINE – BLANK) |
|---|---|---|
| NATIONAL EXPRESS WAY | 3.75 | 8m – 12m |
| HIGH WAY | 3.25 | 8m – 12m |
| NATIONAL WAY | 3.00 | 6m – 9m |
| PREFECTURAL WAY | 2.75 | 5m – 5m |
| MUNICIPAL WAY | 2.75 | 5m – 5m |

SECTION LINE RECOGNITION DEVICE

TECHNICAL FIELD

The present invention relates to a section line recognition device which recognizes a road surface index in a running environment of a vehicle.

BACKGROUND ART

For example, PTL 1 discloses a technique as a section line recognition device which recognizes the road surface index. The section line recognition device disclosed in PTL 1 includes an image capturing unit (single front camera) which captures an image containing the road surface in front of the vehicle, an edge extraction unit which extracts an edge point in the road surface from image information output by the image capturing unit, a line segment extraction unit which extracts a line segment group which has a possibility corresponding to a section line from the edge point, a detection unit which detects a line segment corresponding to the section line from the line segment group, and a setting unit which sets the detection.

Then, the setting unit is configured to set the detection in a case where the detection of the detection unit is not performed by a predetermined number of times of detection, and in a case where the detection of the detection unit is continuously performed by a predetermined number of times of redetection.

In addition, PTL 2 discloses a lane recognition device which recognizes a lane where the own vehicle runs from image information. The lane recognition device includes a plurality of camera which is installed on right and left sides of the vehicle to capture a portion different from a road section line, a plurality of road section line recognition units which are provided in correspondence with these cameras to recognize the road section line in the image, and a determination unit which inquires a recognition result of the road section line recognition unit.

CITATION LIST

Patent Literature

PTL 1: JP 2013-3634 A
PTL 2: JP 2002-92796 A

SUMMARY OF INVENTION

Technical Problem

PTL 1 discloses a technique of setting detection of the section line using the state transition of a recognition state of a single front camera.

However, since the single camera is used in the technique disclosed in PTL 1, there is no means which excludes a non-detection/erroneous detection of the transition when these detections occur with respect to the interval line. Therefore, when a line type is determined, the non-detection/erroneous detection may reflect thereon as it is.

In this way, there is a limit in reliability of the detection result of the single camera.

On the other hand, PTL 2 discloses a technique in which the same white lines are detected by a plurality of cameras when the white lines in a lane where the vehicle runs are detected, and inquires these results to determine whether the results indicate the white line.

In this case, the white line can be determined by inquiring the results of the plurality of cameras even if any one of the cameras has a possibility of the non-detection/erroneous detection.

However, in the technique disclosed in PTL 2, the plurality of cameras cannot always detect the same white line due to the contamination of lenses. For example, the cameras may not function in a case where the front or rear camera is contaminated, or the white line is not visible due to traffic jam.

In addition, the technique disclosed in PTL 2 is only to grasp the possibility of the non-detection/erroneous detection, but fails to disclose a technique of determining the line type.

In addition, it may be considered a method of determining the line type on the basis of a cycle in which the white line can be seen in each frame of the image.

However, the appearance of the white line depends on a distance between the vehicle and the white line. For example, in a case where the vehicle is away from the white line, there is a possibility that a plurality of broken lines is seen. If the vehicle is close to the white line, only one white line may be seen. In addition, in a case where the vehicle is away from the white line, the broken lines may be seen as one solid line. If the vehicle is close to the white line, the white line may be actually a broken line.

Even if these images are evaluated by the same standard such as a total sum of edge strength, a value of an appropriate cycle is hardly obtained. Therefore, it is difficult to determine the line type of the interval line.

An object of the invention is to realize a section line recognition device which can determine the line type of the section line in the road surface with high accuracy.

Solution to Problem

In order to achieve the above object, the invention is configured as follows.

A section line recognition device includes a plurality of cameras, a feature point extraction unit which extracts a feature point from an image of a road surface of a road captured by each of the plurality of cameras, a coordinates transformation unit which transforms coordinates of the feature point extracted by the feature point extraction unit into coordinates of a bird's-eye view coordinate system which is common in the plurality of cameras, a camera determination unit which determines an available camera among the plurality of cameras, a state transition determination unit which determines a state transition of the feature point extracted from an image captured by the camera which is determined as available by the camera determination unit, and a line type determination unit which determines a line type of a section line on the basis of a determination result of the state transition by the state transition determination unit.

Advantageous Effects of Invention

According to the invention, it is possible to realize a section line recognition device which can determine the line type of the section line in the road surface with high accuracy.

BRIEF DESCRIPTION OF DRAWINGS

FIG. 12 is a diagram for describing a state in which the determination of the reliability of step 702 is applied to data 1001 of FIG. 10.

DESCRIPTION OF EMBODIMENTS

Hereinafter, embodiments of the invention will be described with reference to the accompanying drawings. Further, objects, configurations, and effects besides the above description will be apparent through the explanation on the following embodiments.

Embodiments

Hereinafter, the description will be given about an example in which the invention is applied to a section line recognition device in a vehicle.

Figure 1:
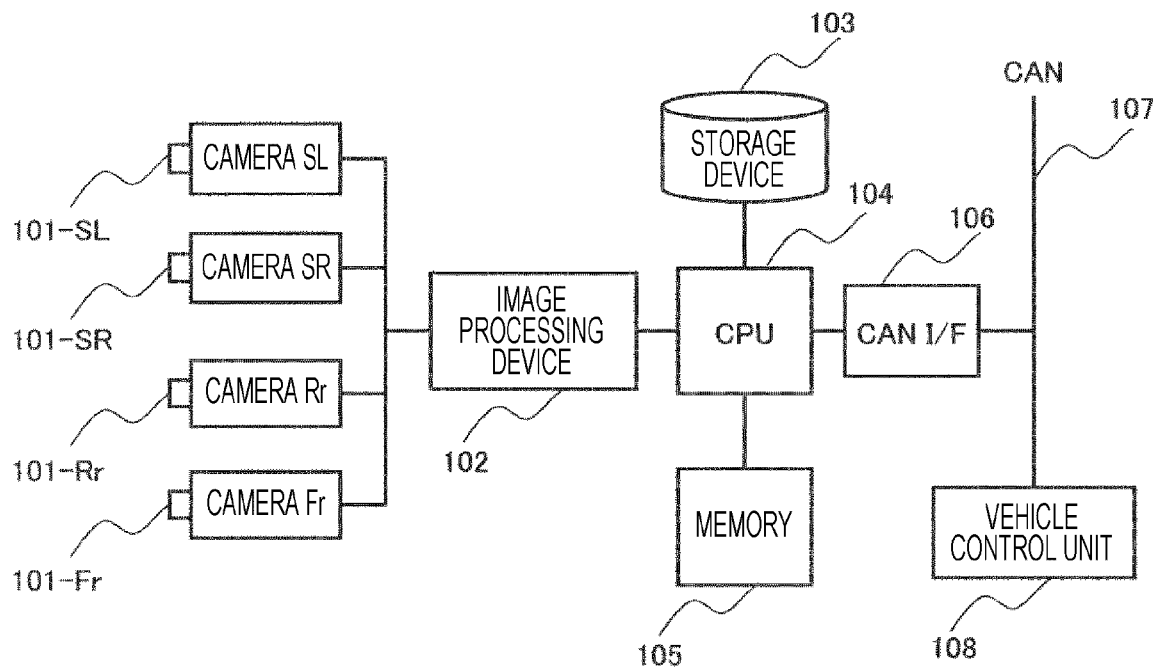
FIG. 1 is a diagram illustrating a schematic configuration of a section line recognition device according to an embodiment of the invention.

FIG. 1 is a diagram illustrating a schematic configuration of a section line recognition device according to an embodiment of the invention.

In FIG. 1, the section line recognition device includes a front camera 101-Fr to monitor the front side of the vehicle, a rear camera 101-Rr to monitor the rear side of the vehicle, a left side camera 101-SL to monitor the left side of the vehicle, a right side camera 101-SR to monitor the right side of the vehicle, an image processing device 102 which processes images from a plurality of cameras (plurality of image capturing units), and a storage device 103 to store map information.

In addition, the section line recognition device includes a CPU 104, a memory 105, and a CAN I/F 106.

The CPU 104 stores information of white lines of an own lane and an adjacent lane of the vehicle in the memory 105 using a processing result of the image processing device 102. Then, the information is sent to a CAN bus 107 through the CAN I/F 106, and sent to a vehicle control unit 108.

Figure 2:
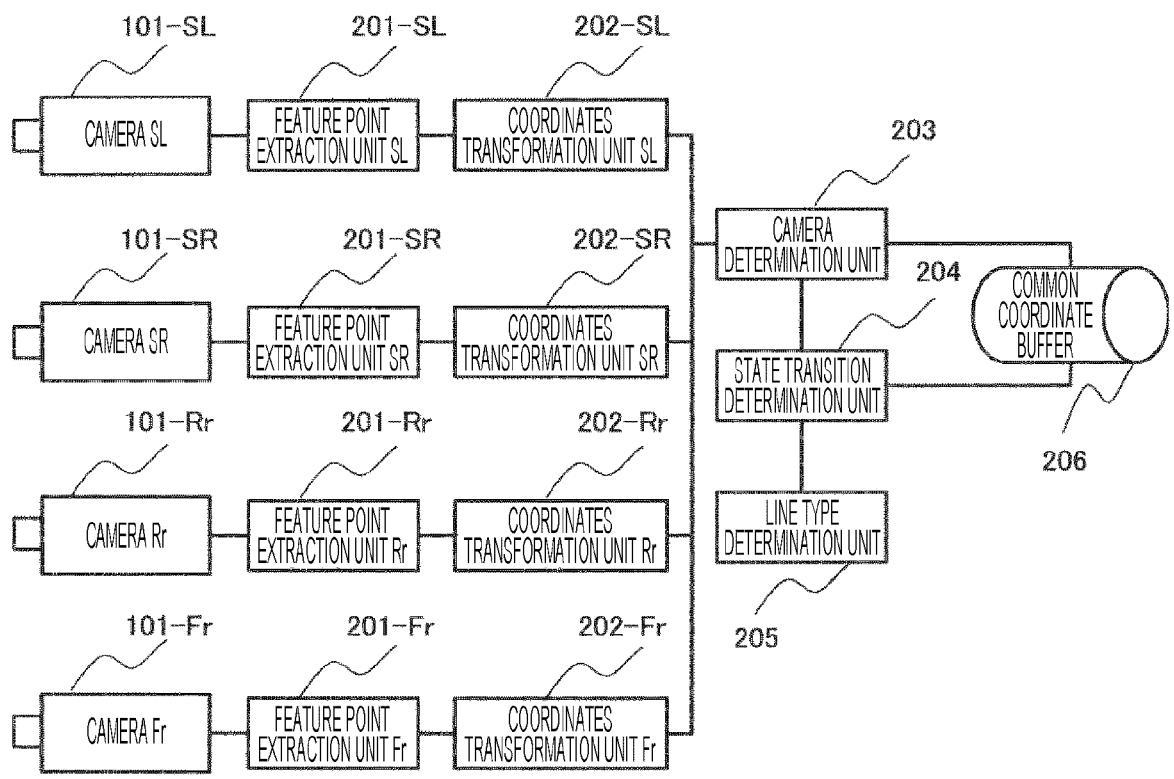
FIG. 2 is a diagram illustrating an example of a software configuration according to an embodiment of the invention.

FIG. 2 illustrates an example of a software configuration according to an embodiment of the invention, and contains internal functional blocks of the image processing device 102 and the CPU 104.

In FIG. 2, a feature point extraction unit 201 (201-SL, 201-SR, 201-Rr, and 201-Fr) and a coordinates transformation unit 202 (202-SL, 202-SR, 202-Rr, and 202-Fr) are provided in correspondence with the cameras 101-Fr, 101-Rr, 101-SL, and 101-SR.

The feature point extraction unit 201 is provided in the image processing device 102, and extracts a feature point from the image captured by the camera 101 (the cameras 101-Fr, 101-Rr, 101-SL, and 101-SR). As an example of the method of extracting the feature point, there is a method of using boundary edges of which the brightness corresponds to black and white. If the distance of these edges corresponds to the white line width, the edges become feature points. Otherwise, there may be considered various methods. In this embodiment, any method may be employed.

The coordinates transformation unit 202 is provided in the image processing device 102, and transforms the coordinates of the feature point obtained by the feature point extraction unit 201 into bird's-eye view coordinates. The transformed result of the bird's-eye view coordinates is collected in a common coordinates buffer memory 206 which is provided in the memory 105.

A camera determination unit 203 determines which feature point of the camera is employed. It is determined whether each camera is contaminated and whether each camera erroneously detects the white line. A suitable camera is selected (an available camera (image capturing unit) is determined).

In addition, a state transition determination unit 204 determines an appearance position of the feature point collected in the common coordinates buffer memory 206, and sets a situation of the presence/absence of a feature point segment (a set of feature points) at each position as a node (an appearance state of the feature point segment) of a state transition model. Further, a transition from the node of the previous frame is determined, and it is determined whether the transition is matched to the state transition model of a broken line. Further, the feature point segment is a set of feature points which are placed near in distance to each other. For example, a set of feature points within 10 cm in distance to each other is defined.

A line type determination unit 205 determines the line type on the basis of the result of the state transition determination unit 204.

The camera determination unit 203, the state transition determination unit 204, and the line type determination unit 205 are functional blocks in the CPU 104.

Further, in this embodiment, the description will be given about that the solid line, the broken line, and both of them are handled as the section lines on the road surface. In the determination of the line type, it is determined as a broken line when a transition situation is matched to the state transition model of the broken line, and neither the erroneous detection nor the non-detection situations occur. In other cases, the solid line or the non-detection is determined as the line type. The detailed process will be described below.

Figure 3:
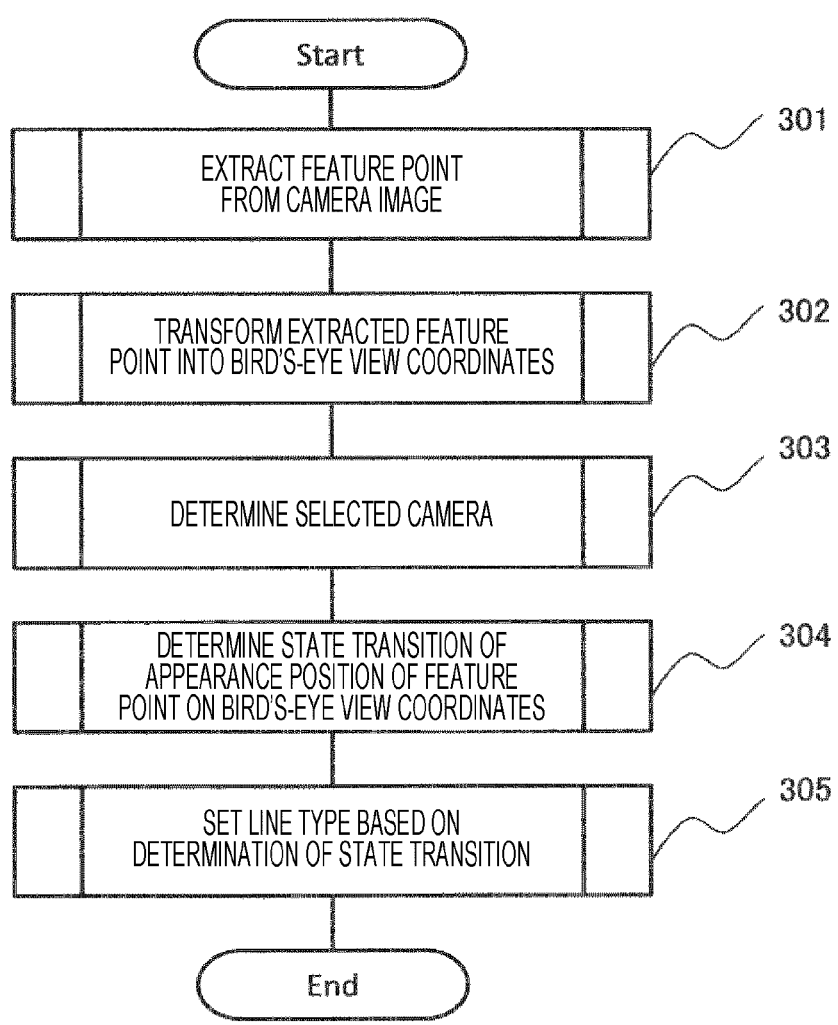
FIG. 3 is a flowchart illustrating a schematic process according to an embodiment of the invention.

FIG. 3 is a flowchart illustrating a schematic process in this embodiment. The flowchart of the process is a process corresponding to one image frame.

First, in step 301 of FIG. 3, a feature amount is extracted from the image captured by each camera 101 (101-SL, 101-SR, 101-Rr, and 101-Fr). This step corresponds to the process of the feature point extraction unit 201.

In the next step 302, the extracted feature amount is transformed into bird's-eye view coordinates which is common coordinates. This step corresponds to the process of the coordinates transformation unit 202.

Next, in step 303, a camera to be selected is determined. This step is a process of the camera determination unit 203.

Next, in step 304, the state transition at the appearance position of the feature point on the bird's-eye view coordinates is determined using feature point coordinates of the camera selected in step 303. This step is a process of the state transition determination unit 204.

Finally, in step 305, the line type is determined. This step is a process of the line type determination unit 205.

Figure 4:
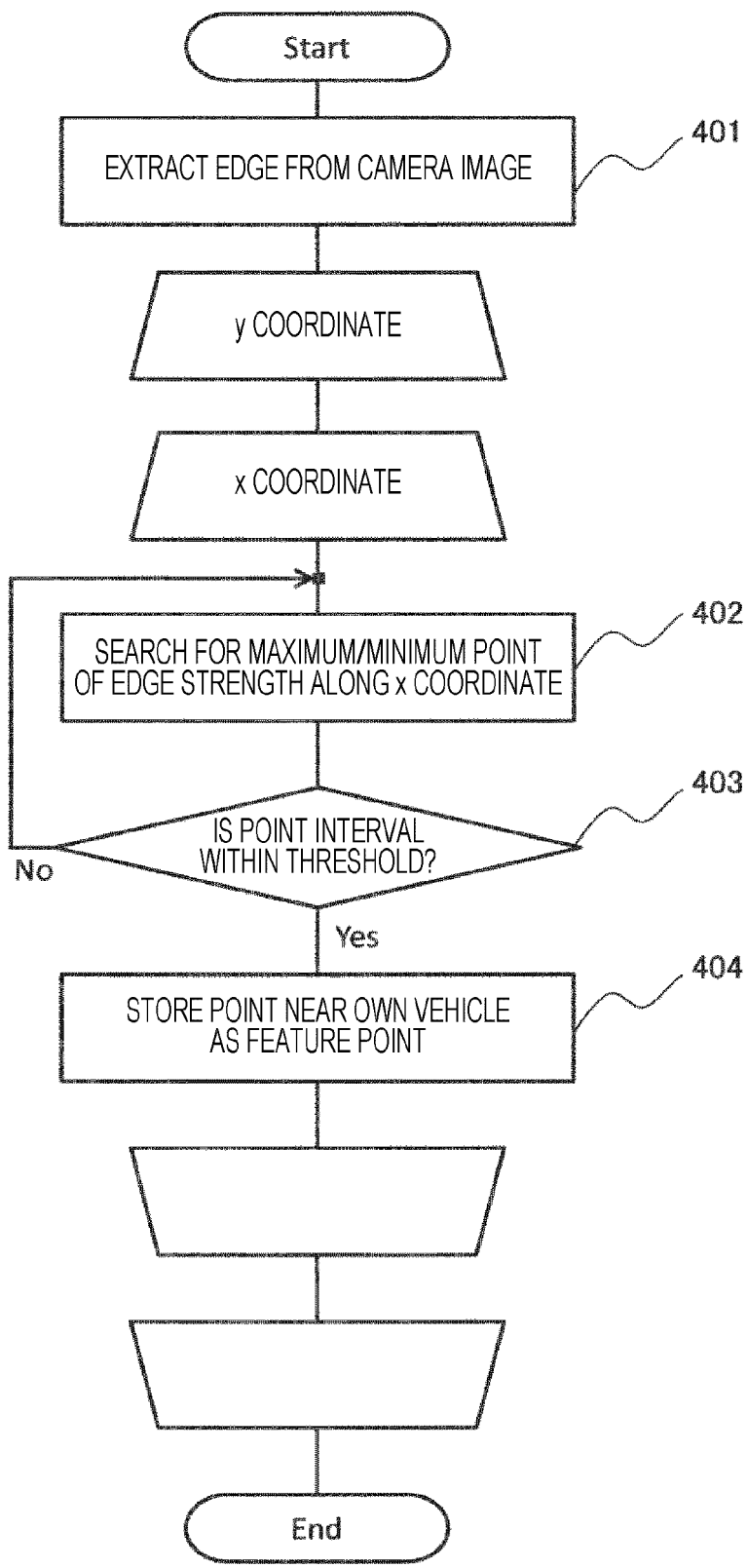
FIG. 4 is a flowchart illustrating a process of a feature point extraction unit.

FIG. 4 is a diagram illustrating a processing flow of the feature point extraction unit 201. Herein, the description will be given on the assumption of the front camera and the rear camera which are mounted in the vehicle.

First, in step 401 of FIG. 4, an edge is extracted from the image input from the camera 101. As a method of extracting an edge, for example, a method of creating an edge image is suitable in which a differential filter such as a Sobel filter is used. Alternatively, the entire image may be classified into a road surface, a white line, or others according to brightness, and the boundary of the classifications may be extracted as an edge.

Next, edge strength is inspected with respect to each extracted edge, and the edges having maximum and minimum strength are retrieved (step 402). First, the edges are retrieved from left to right (in an ascending direction of x coordinates) in each y coordinate, and the edge having positive edge strength is retrieved (the boundary at which the brightness is changed from low to high). Further, the retrieving is performed to right, and the edge having negative edge strength is retrieved (the boundary at which the brightness is changed from high to low).

It is determined whether a difference between the x coordinates of these edges falls within a threshold range (step 403). If the difference falls within the threshold, the edge coordinates near the own vehicle among these edges are stored as the feature point (step 404). This step is performed on all the edge coordinates, so that the feature amount of the white line can be extracted.

Further, in the case of the side camera, there is a need to reverse the x and y coordinates. For example, in the flowchart illustrated in FIG. 4, the x and y coordinates are reversed or the image is rotated by 90° to perform the similar process.

Figure 5:
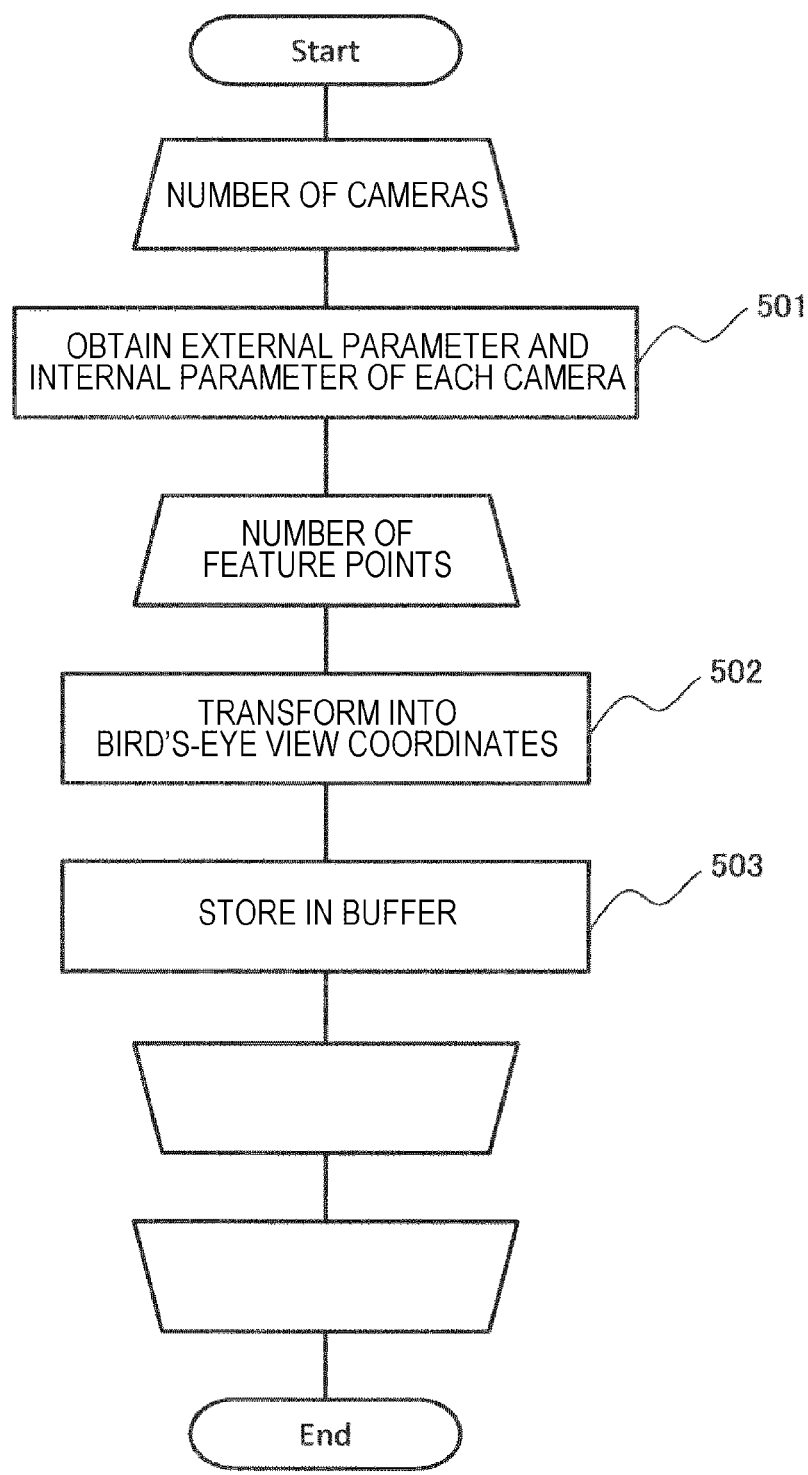
FIG. 5 is a flowchart illustrating a process of a coordinates transformation unit.

FIG. 5 is a processing flow of the coordinates transformation unit 202. In the determination process of the section line, the bird's-eye view coordinates are suitable, and the processing flow illustrated in FIG. 5 is performed on the basis of the bird's-eye view coordinates.

First, in step 501 of FIG. 5, an external parameter and an internal parameter of each camera 101 are acquired. This step is a process called a calibration, and various techniques are disclosed. The calibration process may be performed in various cases, for example, only one time when the vehicle is released, or in real time while running.

In this embodiment, the calibration may be performed whenever the vehicle runs even though a calibration result stored already is acquired.

Next, all the feature points in the image of each camera are transformed into the bird's-eye view coordinates using the parameter of the camera 101 (step 502). In general, a relation between the image coordinates and the bird's-eye view coordinates can be described by the external parameter and the internal parameter of the camera. After transforming to the bird's-eye view coordinates, the result is buffered (step 503 (storing to the common coordinates buffer memory 206)).

The step illustrated in FIG. 5 is performed by the number of cameras 101 and the number of feature points.

Next, the process of the camera determination unit 203 will be described. In the camera determination unit 203, a contaminated camera is excluded, or a feature point segment considered as that the feature point is extracted from a portion other than the white line is excluded.

Figure 6:
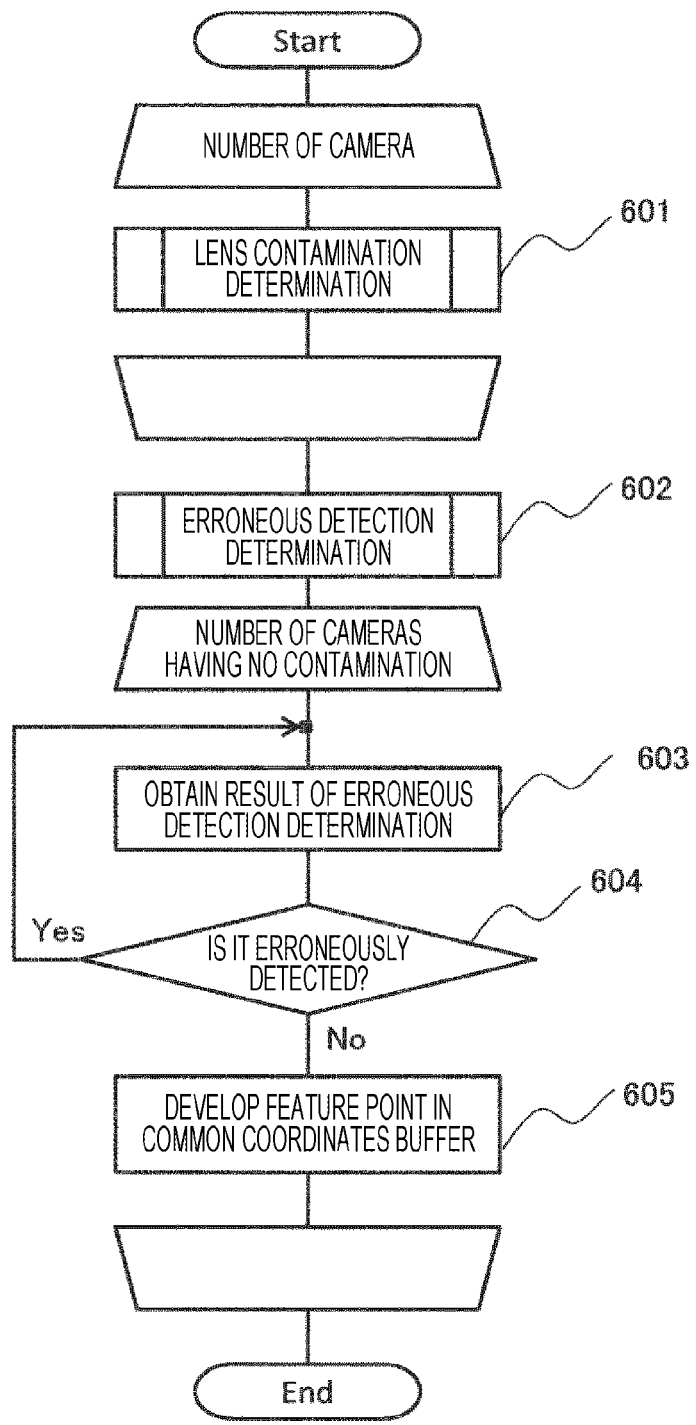
FIG. 6 is a flowchart illustrating a process of a camera determination unit.

FIG. 6 is a diagram illustrating a processing flow of the camera determination unit 203, and a diagram illustrating a flow corresponding to the process of step 303 of FIG. 3. This step is performed on each of the cameras 101.

First, in step 601 of FIG. 6, lens contamination is determined. As this method, a method disclosed in JP 2014-027539 A (a method of calculating a white turbidity on the basis of a brightness gradient of the lens) may be applied.

When the determination on the contamination of all the cameras 101 is ended, the process proceeds to the erroneous detection determination of step 602. The erroneous detection determination determines whether there is an erroneous detection on the basis of the coordinates of the feature point extracted in each camera 101, and is performed on the basis of the feature point coordinates of the camera which is determined as "no contamination". The process of step 602 will be described below.

Further, in a case where all the cameras are contaminated, the determination of erroneous detection is impossible.

Next, the result of the erroneous detection determination of step 602 is obtained with respect to an uncontaminated camera 101 (step 603), and it is determined whether there is an erroneous detection. If there is an erroneous detection, the process proceeds to step 605. The bird's-eye view coordinates of the feature point obtained from the camera 101 which is determined as uncontaminated is developed in the common coordinates buffer memory 206 (the bird's-eye view coordinate is developed in the common coordinates buffer memory 206 like a data structure illustrated in FIG. 19 below).

Figure 7:
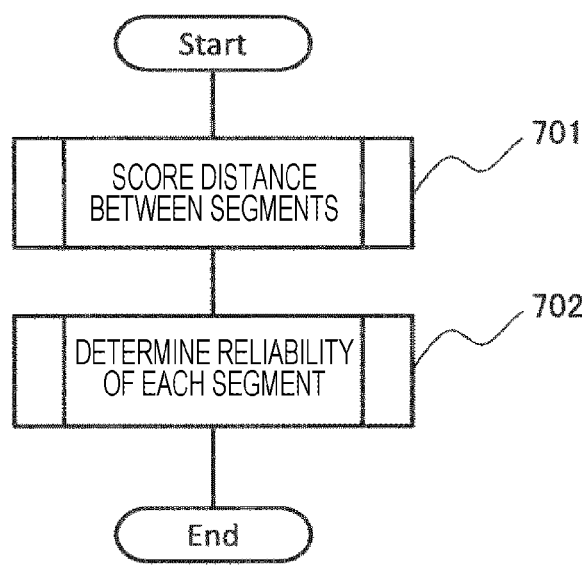
FIG. 7 is a flowchart illustrating a process of erroneous detection determination of step 602 illustrated in FIG. 6.

FIG. 7 is a processing flow of the erroneous detection determination of step 602 illustrated in FIG. 6 (a processing flow for determining (specifying) that the camera where the feature point is extracted from a portion other than the white line (section line is a camera which has an error in detection). First, in step 701 of FIG. 7, a distance between the feature point segments extracted from each camera 101 is scored. Next, reliability of each feature point segment is determined using the score, and the feature point segment of which the reliability is equal to or more than the threshold is left (step 702). The processes of steps 701 and 702 will be described using the drawing again.

Figure 8:
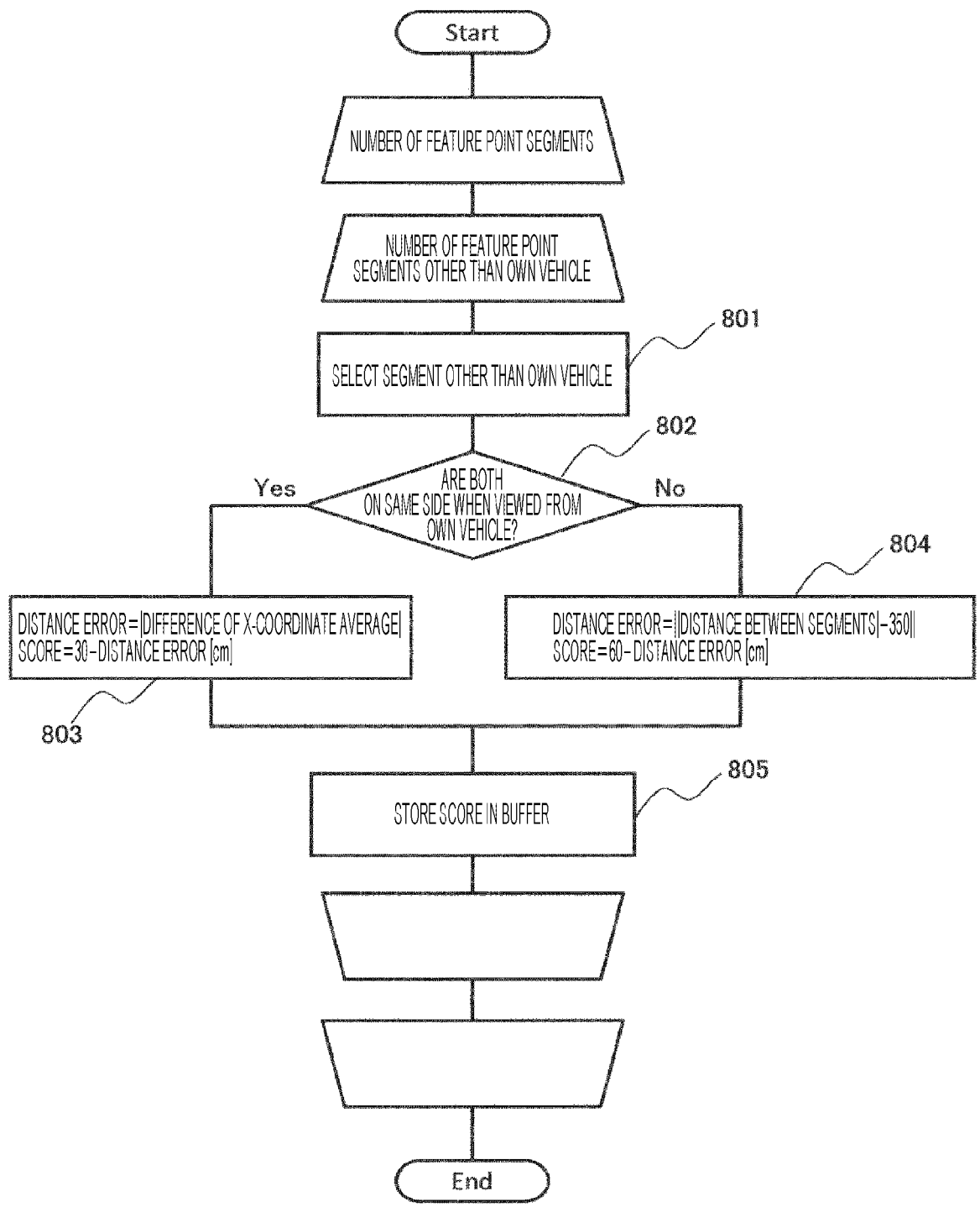
FIG. 8 is a flowchart illustrating a scoring process of step 701 illustrated FIG. 7.

FIG. 8 is a processing flow of scoring of step 701 illustrated in FIG. 7.

First, in step 801 of FIG. 8, a feature point segment (a feature point segment other than the target feature point segment) other than the own segment is selected. In other words, a relation of the own segment and the selected segment is scored. It is determined whether these two segments are on the same side (right or left of the road surface) when viewed from the own vehicle (step 802). If on the same side, the score is calculated according to the Expressions (the following Expressions (1) and (2)) of step 803.

$$\text{Distance Error} = |\text{Difference in } x\text{-coordinate average}| . \quad (1)$$

$$\text{Score} = 30 - \text{Distance Error}[\text{cm}] \ldots \quad (2)$$

In a case where the segments are on the same side, and the distance error is 30 cm or more, the feature point is considered as being extracted from the same white line. Then, the score is set to be positive if the distance error is within 30 cm.

On the other hand, in a case where the segments are on the opposite sides, the score is calculated according to the Expression (the following Expressions (3) and (4)) of step 804.

$$\text{Distance Error} = ||\text{Distance between Segments}| - 350| . \quad (3)$$

$$\text{Score} = 60 - \text{Distance Error}[\text{cm}] \ldots \quad (4)$$

In the above Expression (3), 350 is a lane width (cm).

If the segments are on the opposite sides from each other, the distance between these segments corresponds to the lane width. Therefore, the distance error is a difference between the distance between segments and the lane width. Then, the score is obtained by subtracting the distance error from 60 cm.

In a case where the segments are on the same side, and the distance error is within 30 cm, the segment is considered as the white line. Therefore, if the segments are on the opposite sides, and the distance error is 60 cm (two times), the positional relation is valid. Then, the score is set to be positive in a case where the distance error is within 60 cm. After the score is calculated, the score is buffered in step 805 (stored in the memory 105). This process is performed on all the segments.

However, the value of 30 cm or 60 cm used in FIG. 8 is a value only used for describing this embodiment, and there is a need to be appropriately adjusted for an actual use.

Figures 9, 10:
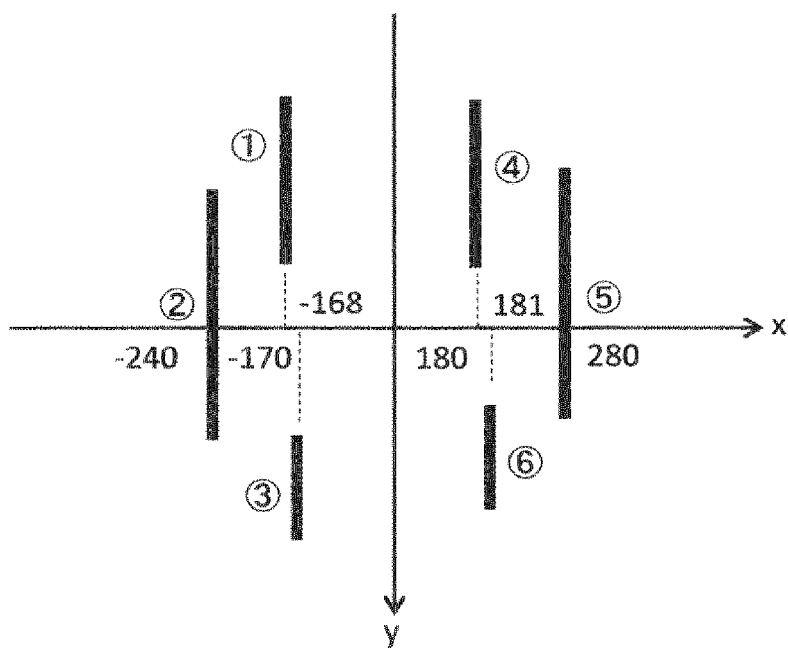
FIG. 9 is a diagram illustrating an example of the appearance of a feature point.
FIG. 10 is a table illustrating data which is generated with respect to combinations of all segments.

Next, the process of scoring of step 701 illustrated in FIGS. 7 and 8 will be described on an assumption of an appearance example of the feature point illustrated in FIG. 9. Line segments of circle 1 to circle 6 of FIG. 9 represent the segments on front left, left side, rear left, front right, right side, and rear right. With respect to this positional relation, a relative distance error of two white lines is defined as illustrated in steps 803 and 804 of FIG. 8 (Expressions (1) to (4)), and the score is calculated for a combination of all the white lines.

In FIG. 9, the coordinate system is a bird's-eye view coordinate system in which the own vehicle is the origin. Further, a unit of measurement illustrated in FIG. 9 is "cm", and the average values of the x coordinates in the segments of circle 1 to circle 6 are −170, −240, −168, −180, 280, and 181 respectively.

For example, a case of scoring a relation between the segment circle 1 and the segment circle 2 illustrated in FIG. 9 will be considered. The segment circle 1 and the segment circle 2 are the same value when viewed from the own vehicle. The distance of the segment circle 1 is −170, the distance of the segment circle 2 is −240, and the distance error becomes |−170−(−240)|=70, so that the score becomes 30−70=−40.

In addition, if the relation between the segment circle 1 and the segment circle 4 is scored, the segment circle 1 and the segment circle 4 are on different sides from each other when viewed from the own vehicle. The distance of the segment circle 4 is 180, and the distance error becomes ||(−170−180)|−350|=0, so that the score becomes 60−0=60.

These calculations are performed on the combinations of all segments of the segment circle 1 to the segment circle 6. FIG. 10 is a table illustrating data 1001 which is generated with respect to the combinations of all segments of the segment circle 1 to circle 6.

Herein, the description will be given on an assumption that the lane width is 350 cm, but the lane width actually differs depending on the roads. In order to handle different lane widths, it is suitable that a road type during running is obtained from a car navigation system to set the lane width for the type. Alternatively, the lane width of the road during running may be obtained from the car navigation system.

Figures 24, 25:
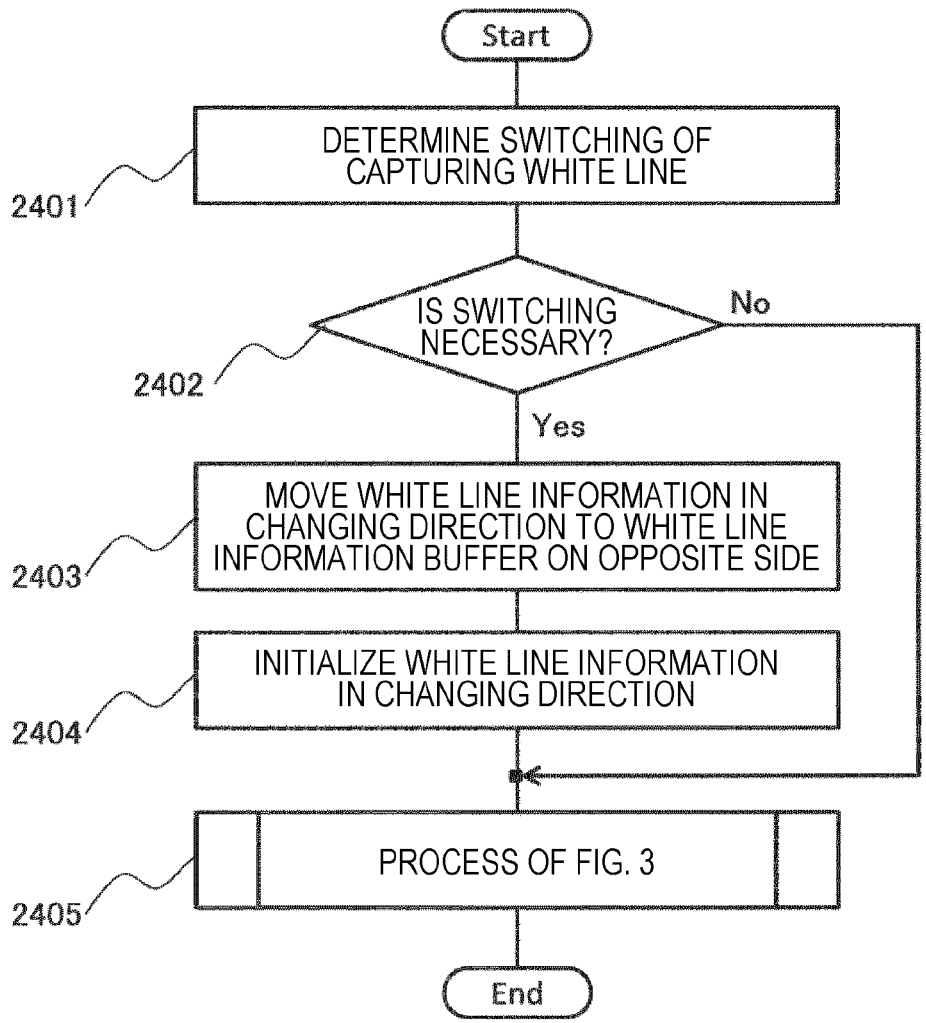
FIG. 24 is a flowchart illustrating a process at the time of a lane change.
FIG. 25 is a diagram illustrating an example of road section line information illustrating a relation between a road type and a road width corresponding to the road type.

FIG. 25 is a diagram illustrating an example of road section line information illustrating a relation between a road type and a road width corresponding to the road type. In FIG. 25, the road section line information 2501 is information obtained from map data which is used by the car navigation system, for example, text data or data which is stored in the storage device 103 as a database.

Further, the road type, the road width, and a broken line interval illustrated in the road section line information 2501 are given as merely exemplary, but not limited thereto. The lane width can be obtained with reference to the data.

Figure 11:
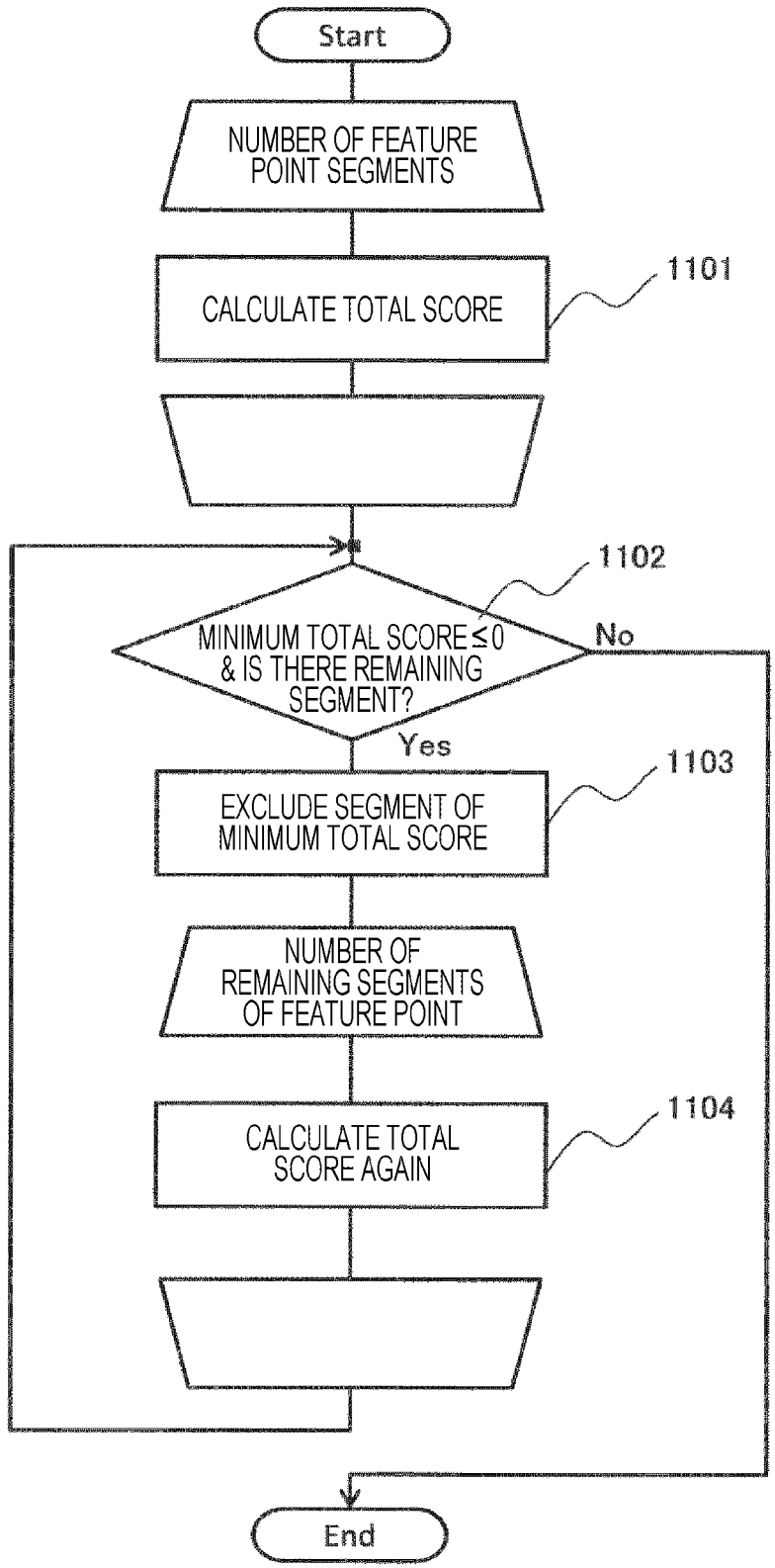
FIG. 11 is a flowchart illustrating a process of determining reliability of step 702.

Next, the determination process of the reliability of step 702 of FIG. 7 will be described. FIG. 11 is a flow of the determination process of the reliability of step 702.

In FIG. 11, first, a total score is calculated with respect to all the feature point segments (step 1101). Next, in step 1102, it is determined whether a minimum value of the total score is 0 or a negative value, and whether there remains a segment of the evaluation target. If both cases are Yes, the process proceeds to step 1103, and a segment having a minimum total score is excluded. Then, the total score is calculated again for the remaining segment (step 1104). When the total score is calculated again, the calculation is performed without the score of the excluded segment. Thereafter, the process returns to step 1102 to perform the same determination. If any one of determinations is No, the process ends. If Yes, the process of step 1103 and the subsequent processes are repeated.

FIG. 12 is a diagram for describing a state in which the determination of the reliability of step 702 is applied to data 1001 of FIG. 10. The determination of the reliability of step 702 will be described using FIG. 12.

In FIG. 12, the result of the process (total score calculation) of step 1101 illustrated in FIG. 11 becomes as data 1201. Next, in step 1102, a minimum value of the total score is determined. At this time, the score "−297" of the segment circle 5 is a minimum (negative) value. Therefore, the process proceeds to step 1103 to exclude the data of the segment circle 5, and the total score is calculated again in step 1104. The result is data 1202.

Next, the process returns to step 1102 of FIG. 11, and a minimum score value is determined. At this time, the score "−103" of the data 1202 is a minimum (negative) value. Therefore, the process proceeds to step 1103 to exclude the data of the segment circle 2, and the total score is calculated again in step 1104. The result is data 1203.

Then, if the process returns to step 1102 to determine the minimum score value, the scores in all the remaining segments of the data 1203 are positive, and thus the process ends. As a result, the segments considered as erroneous detection become the segment circle 2 and the segment circle 5. The feature points of the remaining segment circles 1, 3, 4, and 6 are developed to the common coordinates buffer memory 206.

Next, the determination of the line type using the state transition will be described. The segment determined having no erroneous detection is used in the processing flow illustrated in FIG. 11. However, a case where there is no erroneous detection will be first described. A process in a case where there is an erroneous detection will be described separately.

Figure 13:
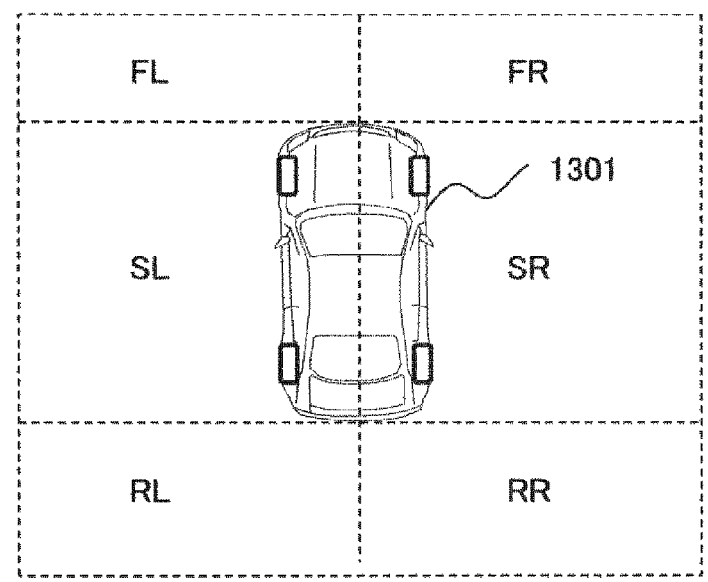
FIG. 13 is a diagram for describing a definition of regions obtained by dividing a peripheral region of a vehicle 1301 on the basis of bird's-eye view coordinates.

FIG. 13 is a diagram for describing a definition of regions obtained by dividing a peripheral region of the vehicle 1301 on the basis of bird's-eye view coordinates. The region becomes a region to determine whether there is a feature point segment by the state transition determination unit 204. In FIG. 13, in this embodiment, regions FL and FR are on a front side of the front camera 101-Fr, regions RL and RR are on a rear side of the rear camera 101-Rr, and the regions SL and SR are between the front camera 101-Fr and the rear camera 101-Rr. In addition, the regions FL, SL, and RL are on the left side of the center of the vehicle 1301, and regions FR, SR, and RR are on the right side.

As illustrated in FIG. 13, the feature point of the front camera 101-Fr appears in the regions FL and FR and the feature point of the rear camera 101-Rr appears in the regions RL and RR on the basis of the set regions. In addition, the feature point of the camera 101-SL is likely to appear in the regions FL and RL, and the feature point of the camera 101-SR is likely to appear in the regions FR and RR.

Figure 14:
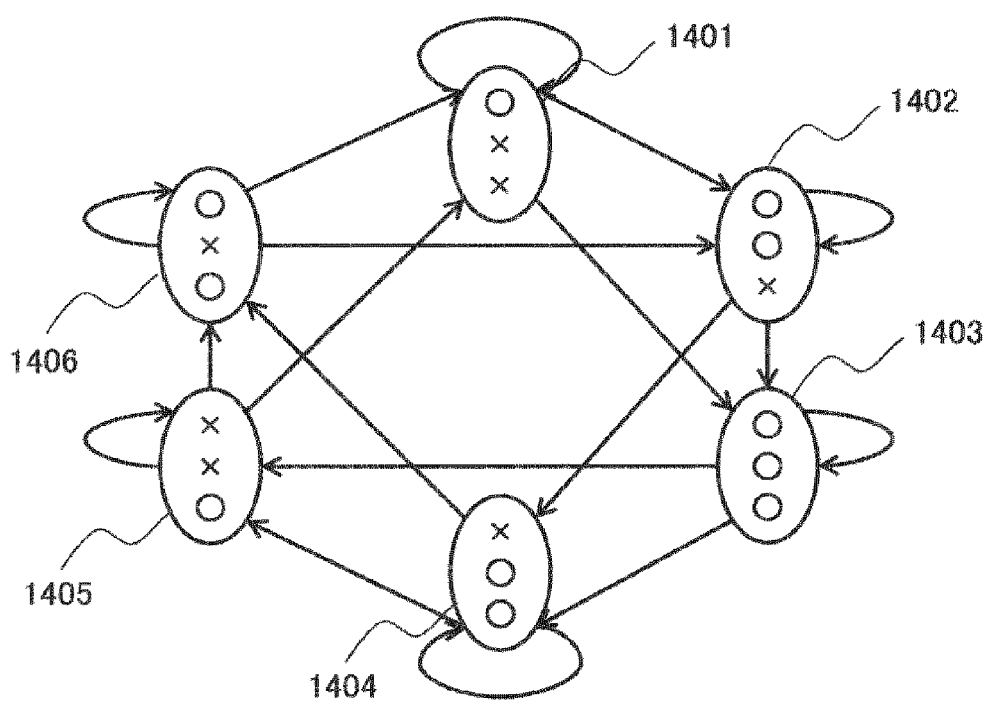
FIG. 14 is a diagram illustrating a state transition model in which a section line is a broken line.

FIG. 14 is a diagram illustrating a state transition model in which the section line is a broken line (a predetermined state transition model showing a transition state of a node indicating an appearance state of a segment which is a set of feature points). In this embodiment, the state transition model will be described to store six nodes 1401 to 1406.

In FIG. 14, the state transition model is common in the right and left white lines. Each node is recorded with the presence/absence of the feature point segment in the front region, the side region, and the rear region from the upper portion. For example, the node 1401 in the left white line is a node indicating that the feature point segment is in the region FL (o), and the feature point segment is not in the regions SL and RL (x).

The line in direct transition from each node to that node indicates that the state is kept.

In addition, the arrow connecting the nodes is a node in transition in a case where the line type is the broken line. In other words, if the transition occurs in the clockwise direction aside or to the neighboring node, it considered to be matched to the transition of the broken line. For example, in the case of the node 1401 in the current frame, and the transition occurs to any one of the nodes 1402 and 1403 in the next frame, the transition is matched to the state transition model of the broken line. If the matched state continues one cycle or more, the line is determined as the broken line.

For example, the transitions occurs from the node 1401 to the node 1402, the node 1402 to the node 1404, from the node 1404 to the node 1406, and then from the node 1406 to the node 1401, which is one cycle (corresponding to a case where an accumulated value is 6), it is determined as the broken line.

However, the condition that the line is determined as the broken line if the transition occurs aside or to the neighboring node and the matched state continues one cycle or more is to describe this embodiment, but is not necessarily limited thereto. For example, a node to be transitioned is not determined in advance, but a node considered to be transitioned is predicted according to a vehicle speed. If a node is matched to the condition, the node may be considered to be matched to the transition of the broken line.

Figure 15:
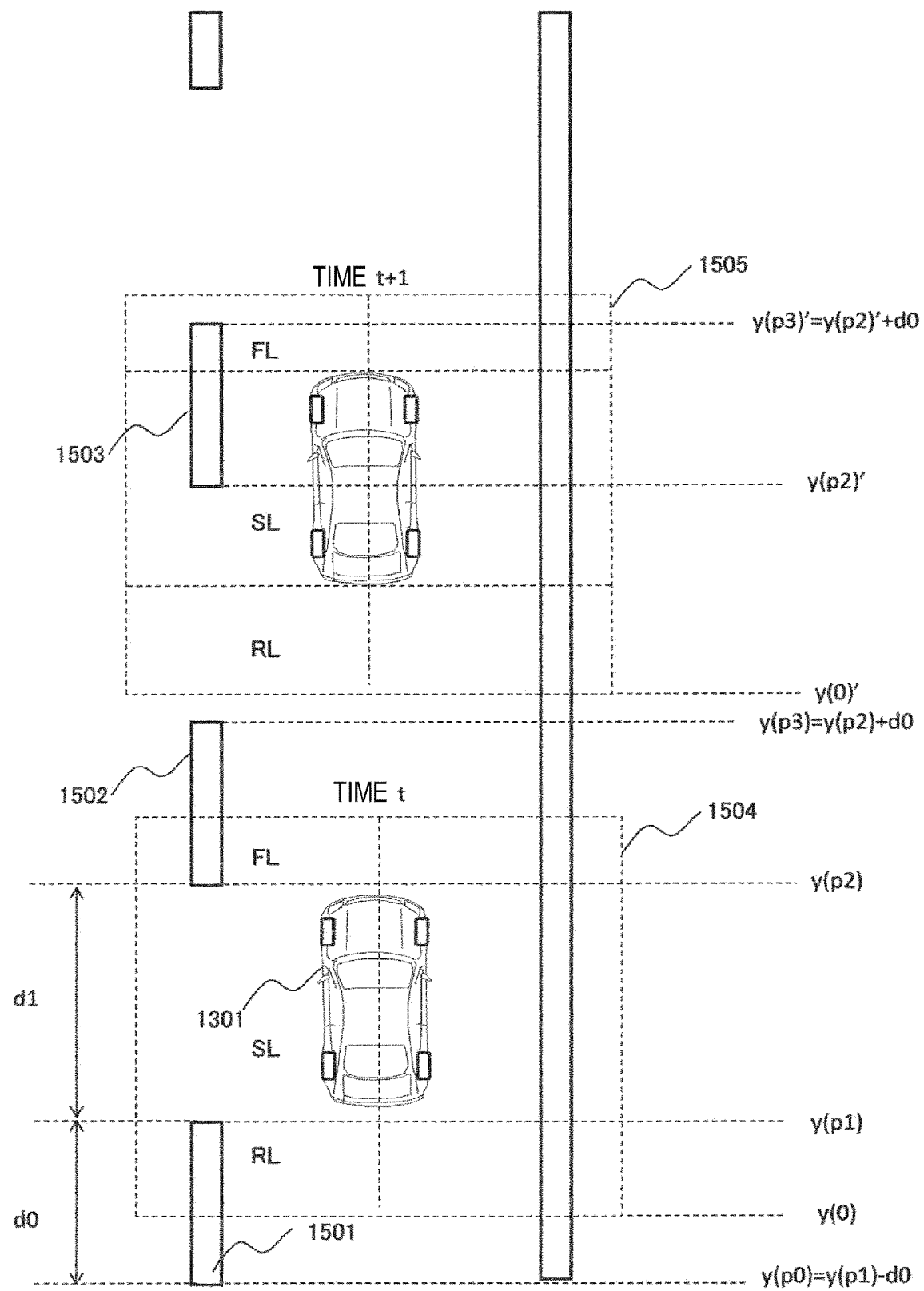
FIG. 15 is a diagram for describing an example in which a node is estimated according to a vehicle speed to determine whether the node is matched to a state transition of the broken line.

With this regard, the description will be given with reference to FIG. 15. FIG. 15 is a diagram for describing an example in which a node is estimated according to a vehicle speed to determine whether the node is matched to a state transition of the broken line.

In FIG. 15, a region obtained by capturing the white line is a region 1504, and a y coordinate of the lower end of a white line 1504L is set to y(t).

In addition, the broken line as the section line is on the left side of the vehicle 1301, the length of the white line of the broken line is set to d0, and a distance between the white lines is set to d1. At this time, the vehicle 1301 captures a lower end point of a white line 1502 by the region FL (the dotted line surrounding FL), and captures an upper end point of a white line 1501 by the region RL (the dotted line surrounding RL). The y coordinates of the lower end point of the white line 1502 and the upper end point of the white line 1501 are y(p2) and y(p1) respectively.

In addition, the y coordinate of the lower end of the white line 1501 is y(p0)=y(p1)−d0, but outside the captured region 1504. The y coordinate of the upper end point of the white line 1502 is similarly y(p3)=y(p2)+d0, but outside the captured region 1504.

At the point of time t, the coordinates of the end points of the broken line in an advancing direction of the vehicle 1301 are obtained. A range to obtain the coordinates is determined by time taken for obtaining the next image frame and the vehicle speed. For example, if the time taken for obtaining the next image frame is 1 second, and the vehicle speed is 40 km/h, the vehicle 1301 runs about 11 m until time t+1. Therefore, if the capturing is performed after about 11 m, the coordinate of the end point of the predicted white line is obtained.

Herein, if d0=3.5 m and d1=4.5 m, the vehicle 1301 runs one cycle distance (d0+d1)+3 m of the broken line during the 11 m running. Therefore, the lower end point of the white line captured in the region FL of the captured region 1505 is located 3 m lower when relatively viewed from the vehicle 1301, and the y coordinate becomes y(p2)'.

Similarly, the upper end point of the white line captured in the region RL is deviated by 3 m lower when relatively viewed from the vehicle 1301, and is outside the captured region 1505 where the white line is captured. In addition, if the upper end point of the white line 1502 is deviated 3 m lower which is the outside of the captured region, the upper end point is considered to fall within the captured region 1505. Therefore, the upper end point of the white line 1503 is captured in the region FL of the captured region 1505, and the lower end point is captured in the region SL.

Further, if relative coordinates of each end point are obtained, and the segment length of each region is obtained, a node pattern is grasped. In the case of this embodiment, the end points are in FL and SL, but not in RL in the captured region 1505. Therefore, it is considered as "oox". It can be predicted to be transitioned to the node 1402. Then, at time t+1, an actual node patter is specified, and it may be determined whether the node pattern is matched to the prediction.

Figure 16:
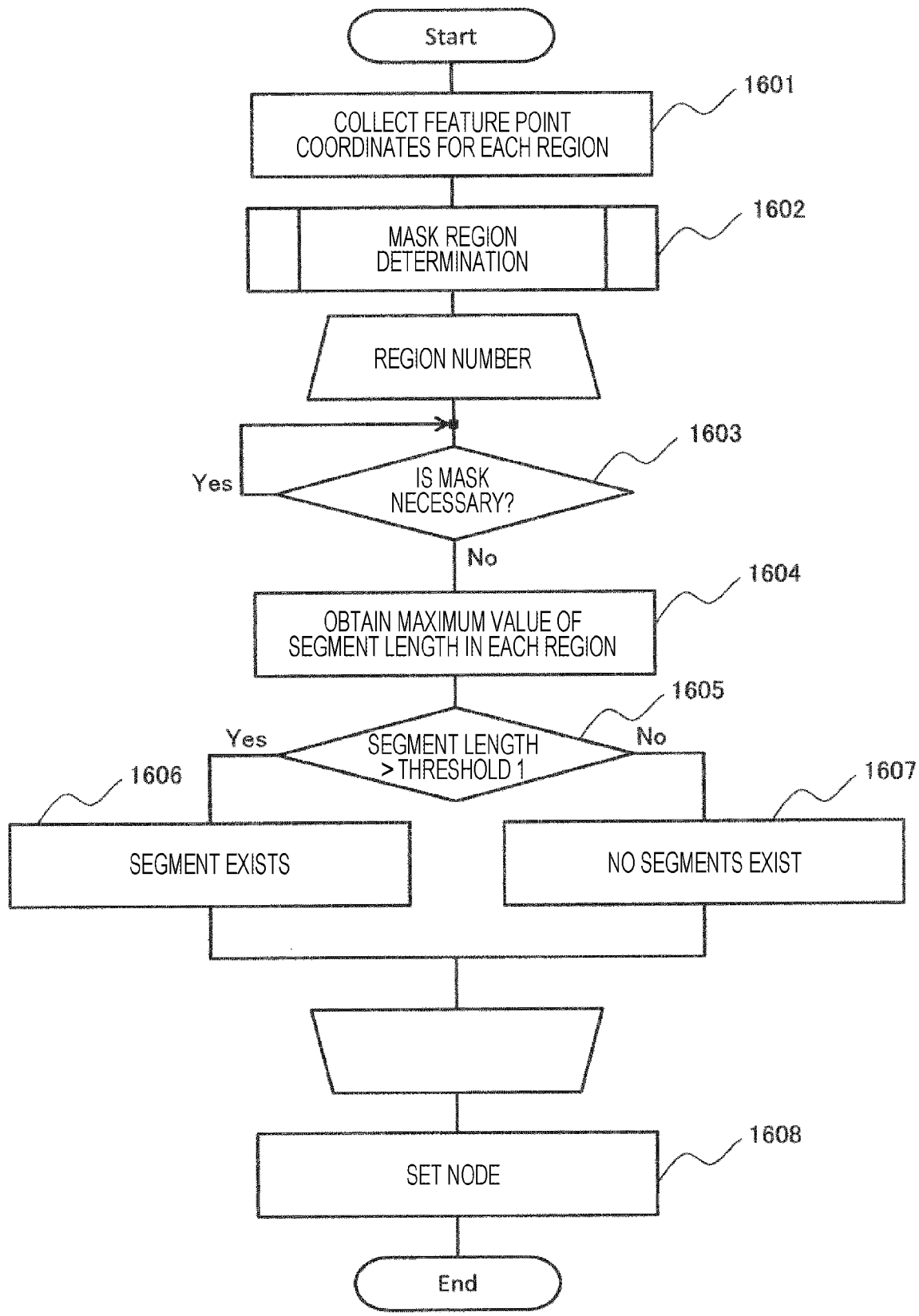
FIG. 16 is a flowchart illustrating a process of determining a node of the state transition model.

FIG. 16 is a processing flow of determining a node of the state transition model. The processing flow illustrated in FIG. 16 is performed on each of right and left white lines. First, in step 1601, the feature points of the cameras 101 are collected for each region of FIG. 13. The collection for each region is performed on the basis only of the bird's-eye view coordinates of each feature point without considering the camera 101 where the feature point is extracted. Next, in step 1602, it is determined whether the feature point of each region is used. This step is performed on the basis of the determination result of the reliability of step 702 of FIG. 7. The process of step 1602 will be described below.

Next, the regions are input in a loop. Each region becomes FL, SL, and RL in the case of the left white line.

First, in step 1603, the result of step 1602 is evaluated. The process returns to the head of the loop in a case where the data of the subject region is not used, and the process of the next region is performed. In this way, in step 1604, a maximum value of the length of the feature point segment in each region is obtained.

Next, in step 1605, it is determined whether the length is longer than a threshold 1. If the length is longer than the threshold 1, it is determined that there is a segment (step 1606). If the length is shorter than the threshold, it is determined that there is no segment (step 1607).

Further, the segment length is an accumulated distance between the feature points. If the distance between the feature points is smaller than a threshold 2 (not illustrated), it is determined that the segment continues. If the distance is longer, it is determined that the segment is disconnected. The presence/absence of the segment is determined on each region to set a node of the current frame (step 1608). In a case where there is no segment in any region, it is considered that there no node.

Figure 17:
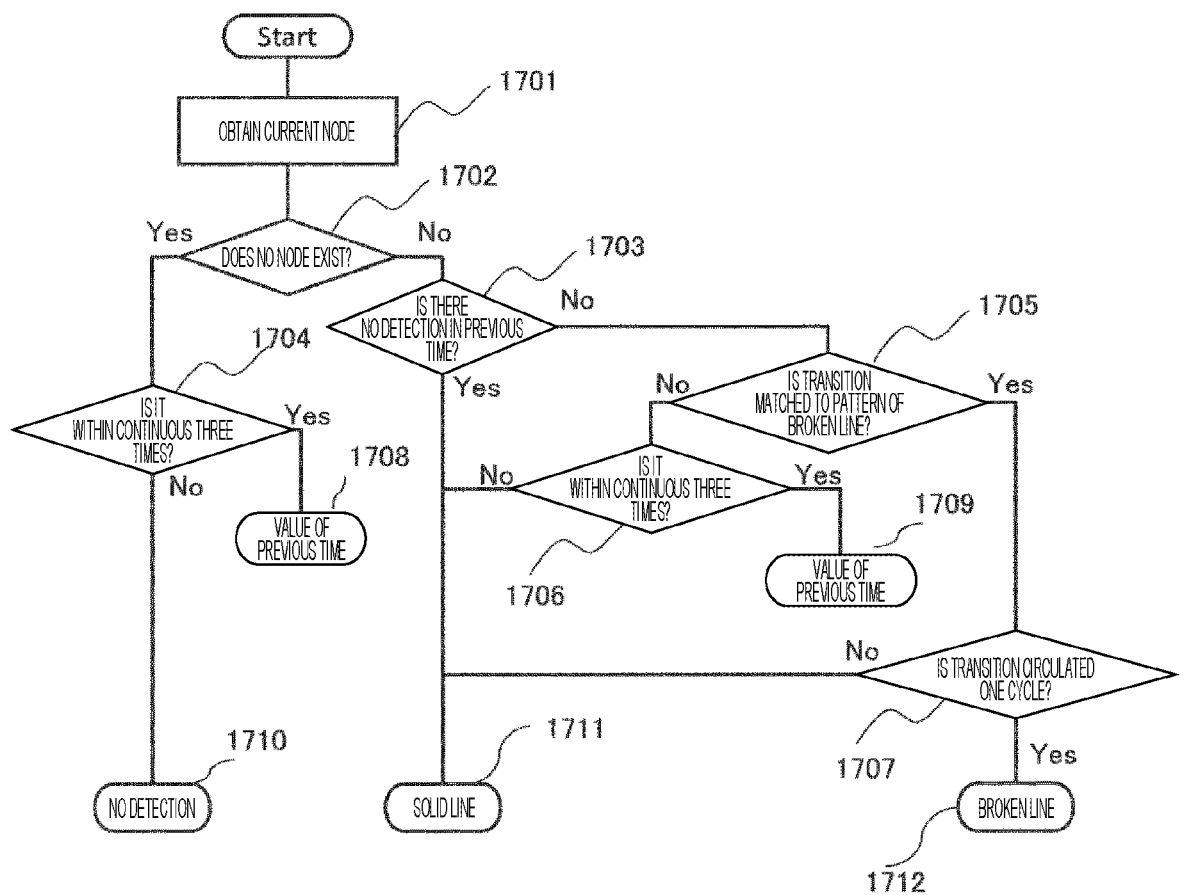
FIG. 17 is a flowchart of determining a line type.

FIG. 17 is a flowchart of determining the line type. First, in step 1701 of FIG. 17, the node of the current frame set in the flowchart of FIG. 16 is obtained. Next, in step 1702, it is determined whether there is no node. If there is no node detected, the process proceeds to step 1704. The detection is continuously performed three times. If it is continuously determined three times that there is no node, it is determined as non-detection (step 1710). If not, the result of the previous frame continues (step 1708).

In a case where it is determined that there is a node in step 1702, it is determined whether it is non detection in the previous frame (step 1703). In a case where it is non-detection in the previous frame, it is determined as the solid line (step 1711). In other words, in a case where there is a node at the beginning after the non-detection, it is determined as the solid line.

In step 1703, in a case where there is a node at the previous frame, it is determined whether the state transition is matched to the pattern of the broken line in step 1705. In the determination, the state transition is considered to be matched to the pattern of the broken line in a case where the moving distance from the node of the previous frame to the node of the current frame is 0 to 2. However, 0 (that is, no movement) is only in a case where there is no-detection three times or more.

As a result of the determination of step 1705, in a case where the state transition is not matched to a transition pattern of the broken line, it is determined whether the state transition is continuously not matched at the third time (step 1706). In the case of the third time, it is determined as the solid line (step 1711). In a case where there is no node at the third time, the result of the previous frame continues (step 1709).

In the determination of step 1705, in a case where the state transition is matched to the transition pattern of the broken line, it is determined whether the transition of FIG. 7 is completed one cycle in step 1707 (time-series data of the nodes is used for determination). If one cycle is completed, the line type is set as the broken line (step 1712). If not, the line type is set to the solid line (step 1711). One cycle may be determined by determining whether an accumulated value of the differences from the node of the previous frame becomes 6 or more. In a case where the determination on the line type in step 1704 is No or the determination in step 1703 is Yes, the accumulated value is set to 0. If not, it is considered as the accumulation proceeds.

The above process will be described again using an appearance example of the feature point illustrated in FIG. 18. (a) to (e) of FIG. 18 illustrate the captured region of the white line defined in FIG. 13.

Figure 18:
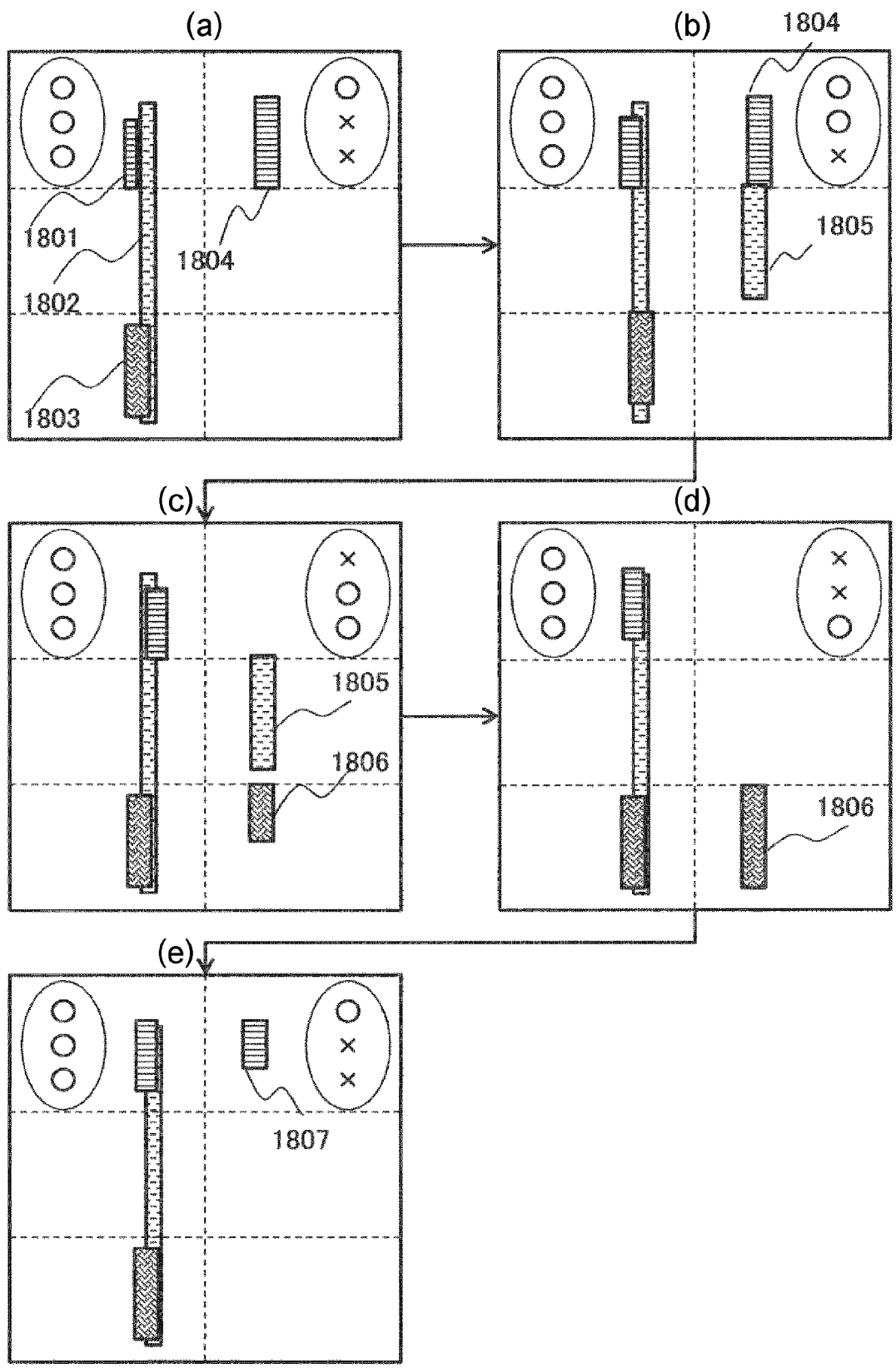
FIG. 18 is a diagram illustrating an appearance example of the feature point.

In (a) of FIG. 18, feature point segments 1801 and 1804 are extracted from the camera 101-Fr, a feature point segment 1802 from the camera 101-SL, and a feature point segment 1803 from the camera 101-Rr. The feature point segments appear in the regions FL, SL, RL, and FR when viewed from the captured region.

Therefore, the node pattern of the left white line becomes "ooo", and the node 1403 illustrated in FIG. 14 becomes a node of the current frame. In addition, the node pattern of the right white line becomes "oxx", and the node 1401 becomes a node of the current frame. At this time point, the right white line and the left white line both are determined as the solid line.

Next, in (b) of FIG. 18, the node pattern of the left white line is the same as that in (a) of FIG. 18. With respect to the right white line in (b) of FIG. 18, the feature point segment 1804 is extracted from the camera 101-Fr, and a feature point segment 1805 from the camera 101-SR. Since the segment appears in the regions FR and SR, the node pattern becomes "oox", and the node 1402 becomes a node of the current frame. In addition, in the right white line, the moving distance from the node of the previous frame becomes "1", and the accumulated value also becomes "1". Even at this time point, the right white line and the left white line are also determined as the solid line.

Next, in (c) of FIG. 18, there is no change in the node pattern of the left white line. On the other hand, with respect to the right white line, the feature point segment 1805 is extracted from the camera 101-SR, and a feature point segment 1806 from the camera 101-Rr. Since the segment appears in the regions SR and RR, the node pattern becomes "xoo", and the node 1404 becomes a node of the current frame. The moving distance from the previous frame becomes "2", and the accumulated value becomes "3". Even at this time point, the right white line and the left white line are also determined as the solid line.

Next, in (d) of FIG. 18, there is no change in the node pattern of the left white line. On the other hand, with respect to the right white line, the feature point segment 1806 from the camera 101-Rr. Since the segment appears only in the region RR, the node pattern becomes "xxo", and the node 1405 becomes a node of the current frame. The moving distance from the previous frame becomes "1", and the accumulated value becomes "4". Even at this time point, the right white line and the left white line are also determined as the solid line.

Next, in (e) of FIG. 18, there is no change in the node pattern of the left white line. On the other hand, with respect to the right white line, a feature point segment 1807 is extracted from the camera 101-Fr. Since the segment appears only in the region FR, the node pattern becomes "oxx", and the node 1401 becomes a node of the current frame. The moving distance from the previous frame becomes "2", and the accumulated value becomes "6" (the nodes of FIG. 14 are circulated one cycle). At the time point, it is determined that the right white line is the solid line, and the left white line is the broken line.

Figure 19:
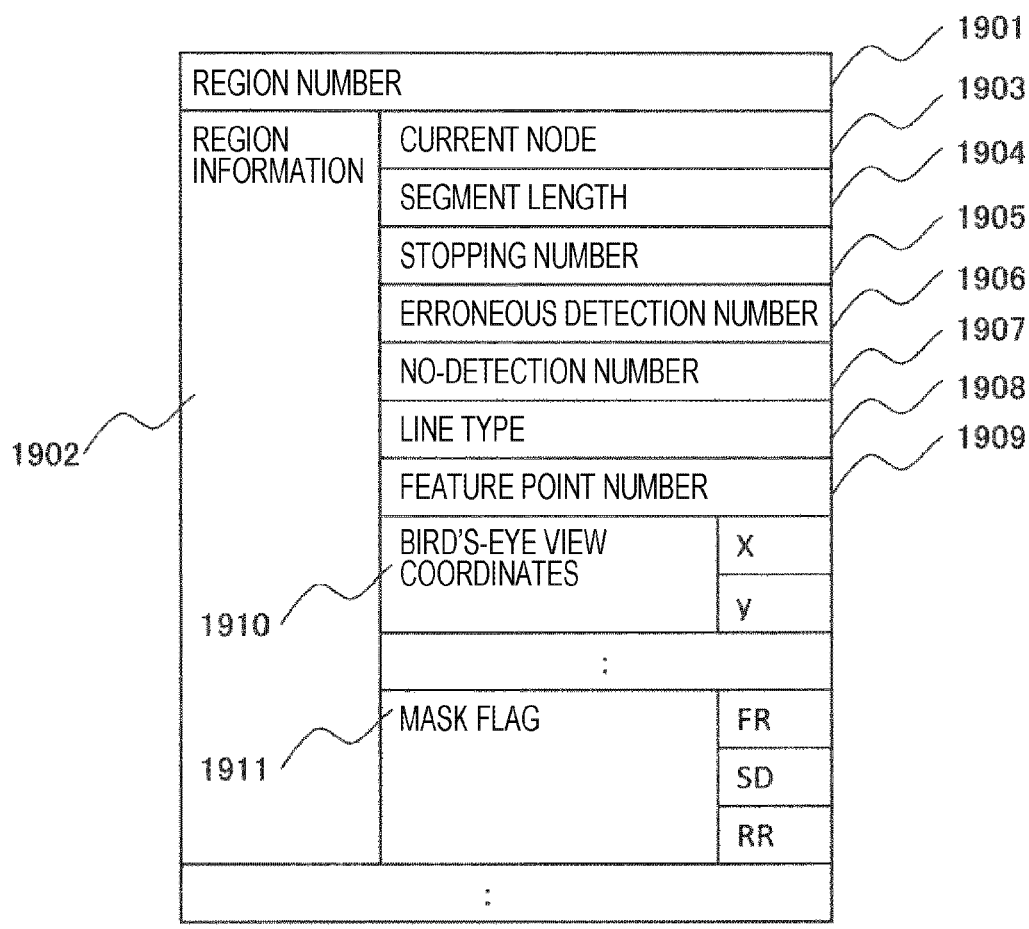
FIG. 19 is a table illustrating a data structure which is stored internally.

FIG. 19 is a table illustrating a data structure which is stored internally. The data illustrated in FIG. 19 is kept for each region illustrated in FIG. 13.

In FIG. 19, a region number 1901 represents the number of regions storing data, and corresponds to "6" (FL, FR, SL, SR, RL, and RR in this embodiment). Region information 1902 is information necessary to determine the line type. Among them, the current node 1903 is a node of the current frame, IDs assigned to the nodes 1401 to 1406 are stored. A segment length 1904 is a length of the feature point segment, and is preferably stored in a unit of cm. A stopping number 1905 represents the number of continuous frames which stop at the same node.

An erroneous detection number 1906 represents the number of continuous frames which are not in the state transition. A non-detection number 1907 represents the number of continuous frames of which the line types are not set. A feature point number 1909 represents the number of feature points which are contained in the subject region. A bird's-eye view coordinate 1910 is stored with the bird's-eye view coordinates of the feature points as many as the feature point number 1909. A mask flag 1911 is stored with a flag for each region indicating whether the data of the subject region is used when determining the line type. In a case where the flag is set, the subject region among the node patterns of the nodes 1401 to 1406 is masked when determining the line type.

Figure 20:
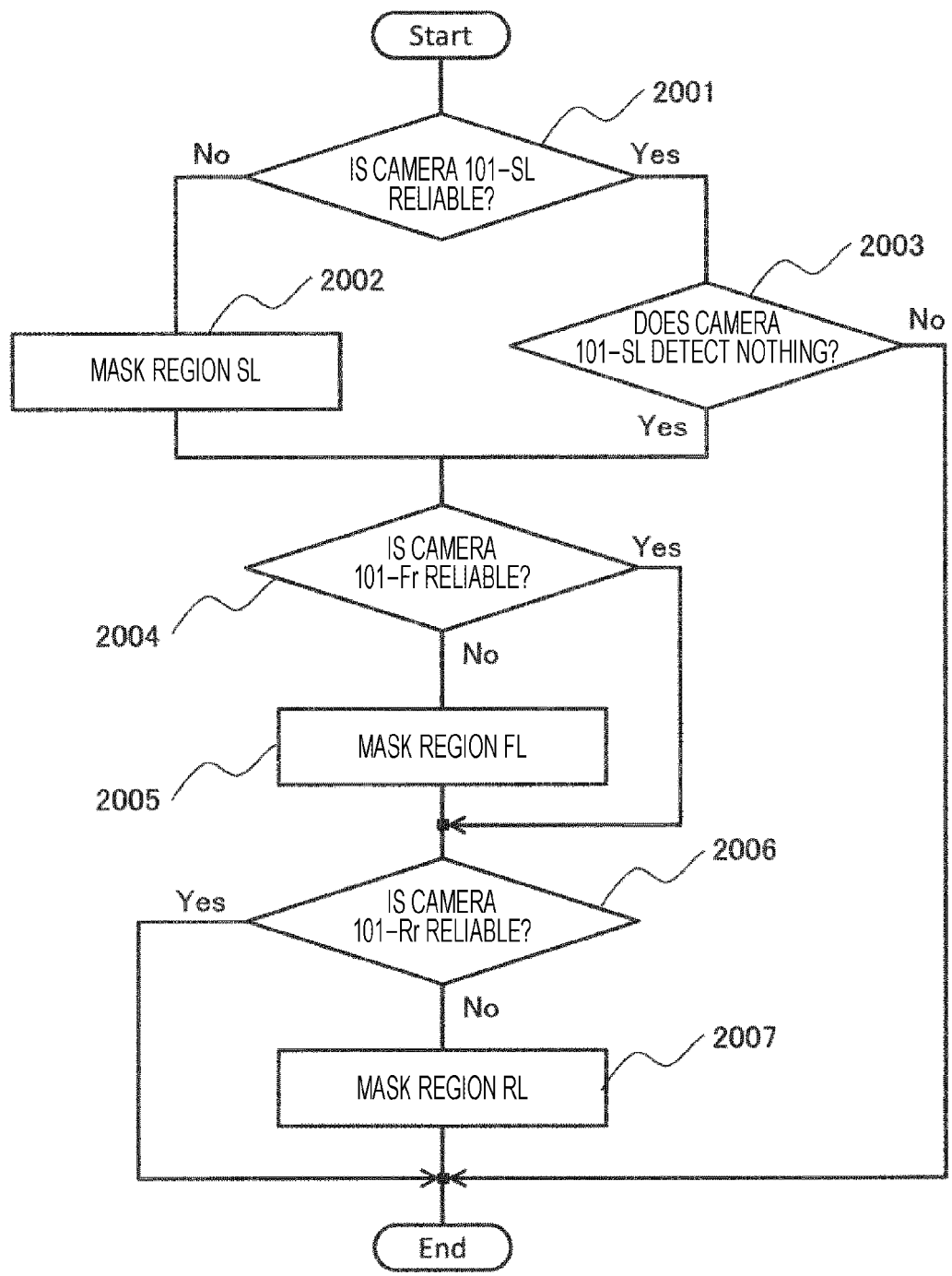
FIG. 20 is a flowchart illustrating a process of determining a mask region of step 1602 illustrated in FIG. 16.

FIG. 20 is a flowchart illustrating a process of determining a mask region of step 1602 illustrated in FIG. 16. The cameras 101-Fr and 101-Rr capture the white line on the front side from the installed places. Therefore, the extracted feature points are also collected only in the regions FL and FR and the regions RL and RR. On the other hand, in the camera 101-SL and 101-SR, the solid line is viewed horizontally long, and the extracted feature points are distributed in plural regions.

Therefore, in a case where the camera 101-SL is not reliable, the region SL may be masked. On the other hand, in a case where the camera 101-Fr and 101-Rr are not reliable, there is a need to determine the presence/absence of the mask in consideration of the extraction situation and the reliability of the feature point in the camera 101-SL. FIG. 20 is a processing flow illustrating the above configuration. Further, the description will be given on an assumption of the determination of the left white line.

In FIG. 20, first, step 2001 is branched depending on whether the camera 101-SL is reliable. In a case where the camera is not reliable, the region SL is masked in step 2002. In a case where the camera is reliable, the process proceeds to a branch of whether the camera 101-SL is a non-detection of step 2003, and the process ends without depending on the non-detection. In step 2003, in a case where the camera 101-SL is a non-detection, it is determined that the cameras 101-Fr and 101-Rr are masked. In FIG. 20, the determination on the camera 101-Fr is performed in advance, any step may be performed first.

In step 2004, the process is branched depending on whether the camera 101-Fr is reliable. In a case where the camera is not reliable, the region FL is masked in step 2005. If not, the process proceeds to step 2006 where it is determined whether the camera 101-Rr is reliable. In a case where the camera is not reliable, the region RL is masked in step 2007. If not, the process ends.

Further, the masking process may be applied even to a lane change. The white line under the vehicle 1301 in the lane change is not possible to be captured by the side cameras 101-SL and 101-SR. Therefore, the information of the side cameras 101-SL or 101-SR installed in the direction of the lane change is considered not reliable, and the process of FIG. 19 may be performed. For example, in a case where the vehicle moves to the right line, the process may be performed in consideration of that the camera 101-SR is not reliable.

Figure 21:
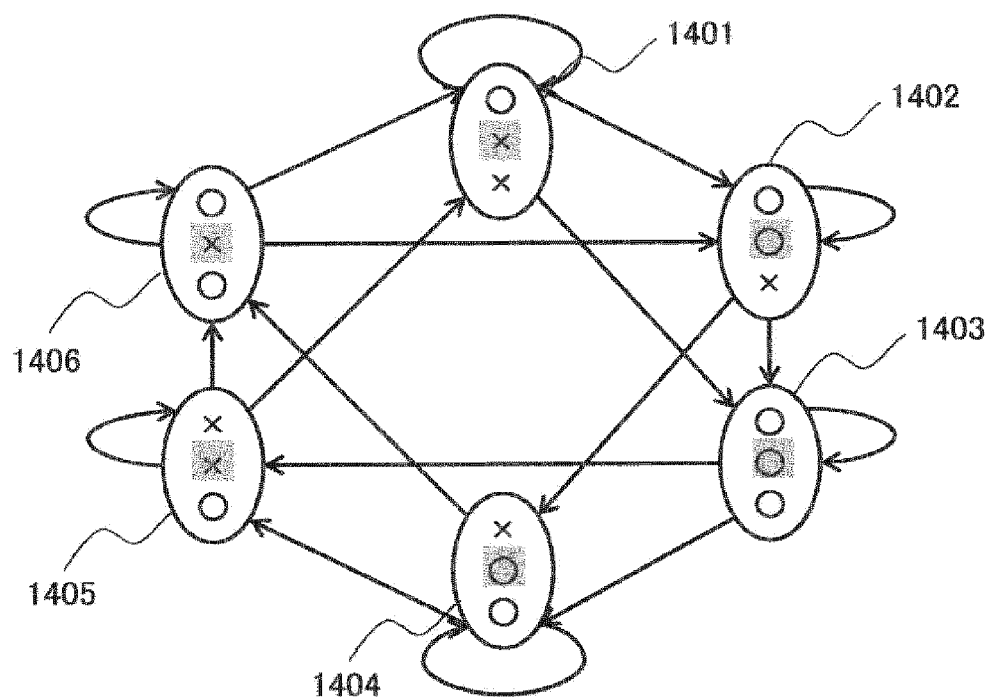
FIG. 21 is a diagram illustrating the state transition model of the broken line in a case where a side camera is not reliable.

FIG. 21 is a diagram illustrating the state transition model of the broken line in a case where the side camera is not reliable. Further, the reason why the camera is not reliable is because the camera may be contaminated to cause an erroneous detection as described above. Herein, the description will be given about an example in a case where the region SL is masked on an assumption that the left white line is determined. In this case, the portion of the region SL is masked in the node pattern of each node (in FIG. 21, the place corresponding to the region SL is illustrated gray). In other words, the line type is determined by only the information of the regions FL and RL. In addition, the node pattern created from the extraction result of the feature point is also similarly masked in the SL portion. In this way, the line type can be determined without creating the state transition model again.

Further, even in a case where the front camera 101-Fr is not reliable, the state transition model in which the FL portion is masked is created. In this case, the line type is determined by only the information of the regions SL and RL from the left side camera 101-SL and the rear camera 101-Rr. Further, even in a case where the rear camera 101-Rr is not reliable, the state transition model in which the RL portion is masked is created. In this case, the line type is determined by only the information of the regions FL and SL from the front camera 101-Fr and the left side camera 101-SL.

The description has been made on the assumption of a straight road, but the invention may be applied even to a case where the road is curved. In a curve, if the feature point is transformed into the bird's-eye view coordinates, the feature point segment is viewed as a curve. In this case, the above processes can be performed by linearly arranging the feature points again on the basis of the curvature of the curve.

Figure 22:
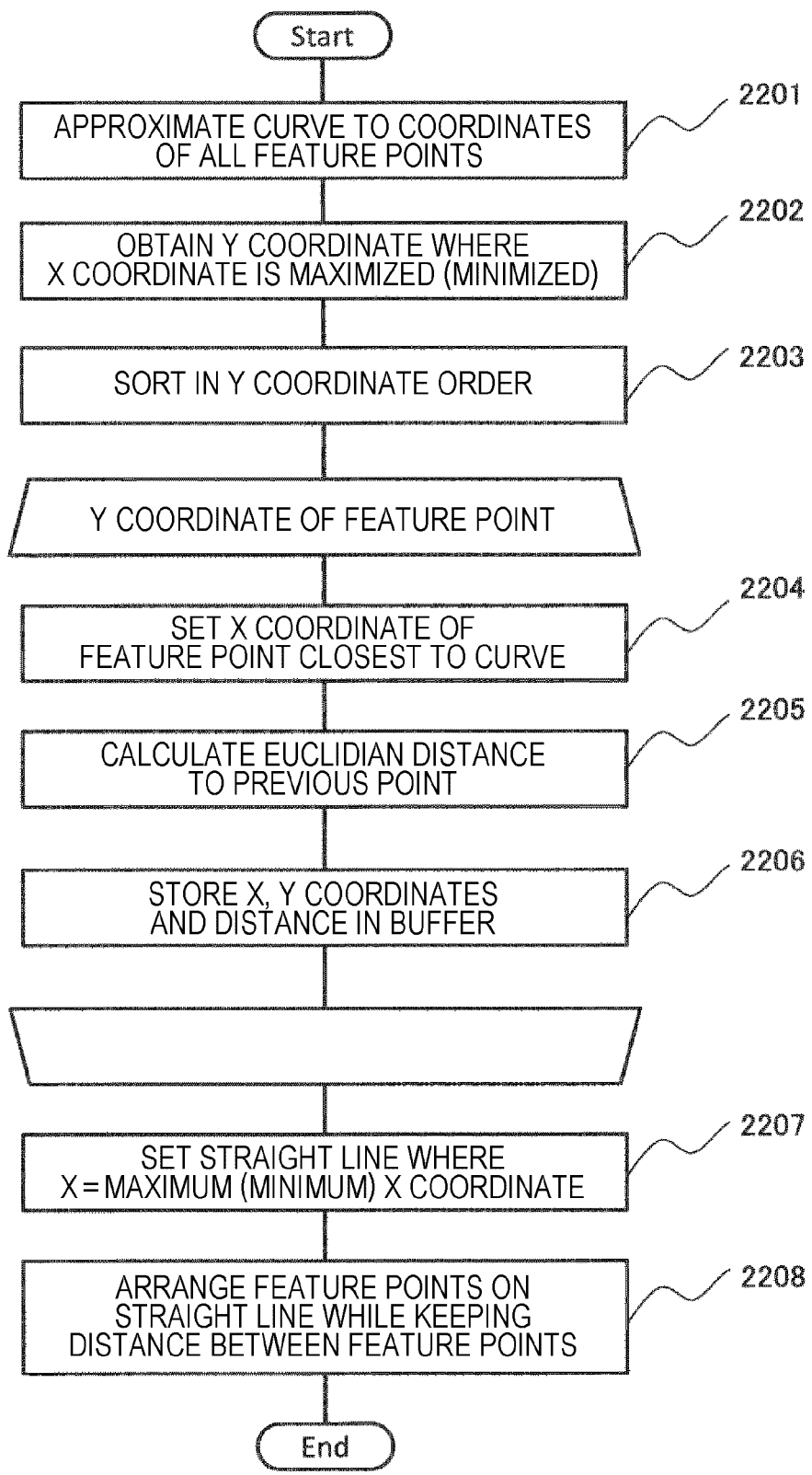
FIG. 22 is a flowchart illustrating a process necessary for a curve.

FIG. 22 is a flowchart illustrating a process necessary for the curve. The process is performed by the coordinates transformation unit 202.

In FIG. 22, first, in step 2201, the curve is approximated on the basis of all the feature point coordinates of the white line on one side. The curve approximation may be performed by various well-known techniques. Next, in step 2202, a y coordinate at which the x coordinate is maximized (or minimized) is obtained in the curve. Next, in step 2203, the feature points are sorted in an order of the y coordinates.

Next, the feature points are input in a loop in an order of the y coordinates. First, in step 2204, an x coordinate at which the distance to the curve is minimal is searched for. After setting the x coordinate, a Euclidean distance to the feature point at which the distance to the curve is minimal which is set by the y coordinate before is calculated (step 2205). Then, the distance to the feature point coordinates is buffered (step 2206).

If the distance is deviated from the loop, a straight line having x=maximum (minimum) x coordinate is set (step 2207), the feature point having the shortest distance to the curve is arranged on the straight line while keeping the distance between the feature points (step 2208).

Figure 23:
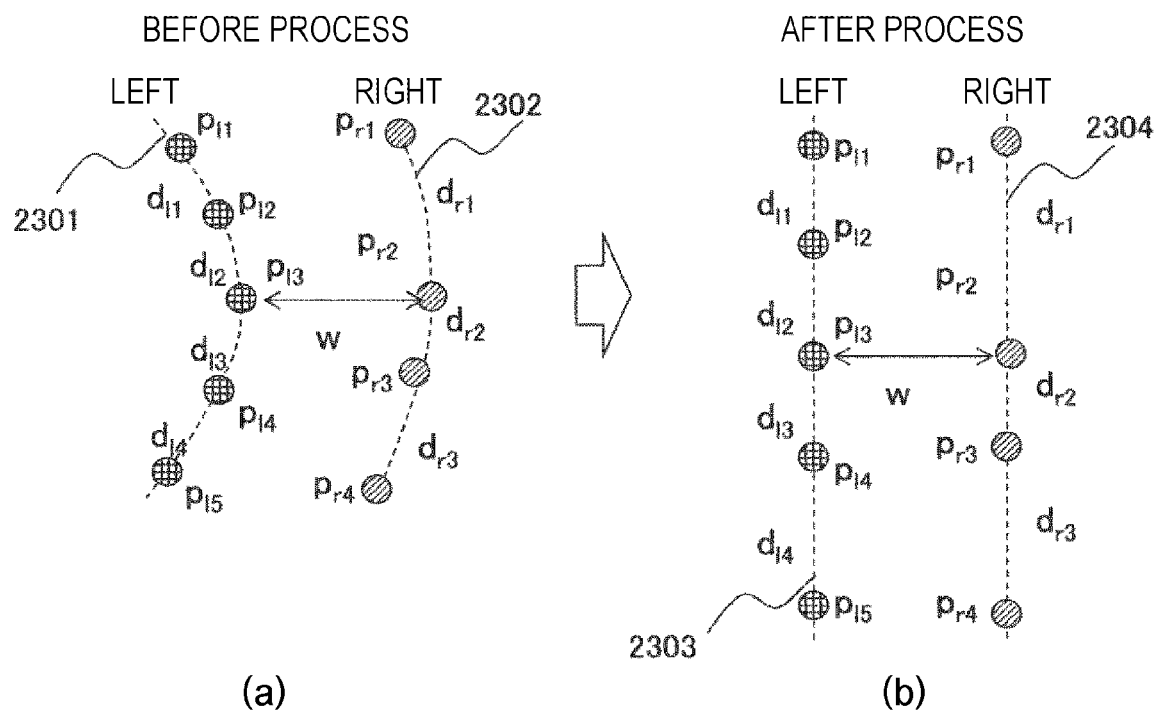
FIG. 23 is a diagram schematically illustrating a curve handling process.

FIG. 23 is a diagram schematically illustrating the curve handling process described above. (a) of FIG. 23 is a diagram before processing, and (b) of FIG. 23 is a diagram after processing.

In (a) of FIG. 23, a curve 2301 is an approximated curve using feature points $p_{l1}$ to $p_{l5}$ extracted from the left white line. A curve 2302 is an approximated curve using feature points $p_{r1}$ to $p_{r4}$ extracted from the right white line. Further, the suffixes of the feature points are sorted in an order of the y coordinates. In addition, the distances between the feature points $d_{l1}$ to $d_{l4}$ and $d_{r1}$ to $d_{r3}$ are results calculated in step 2205 illustrated in FIG. 22. In addition, the lane width w is a distance between points at which the curves 2301 and 2302 are maximized (minimized). When step 2207 of FIG. 22 is performed, the lane width w is kept as it is to set a straight line passing these maximum (minimum) points to be in parallel to the y axis.

In this way, the straight lines set with respect to the curves 2301 and 2302 are the straight lines 2303 and 2304 illustrated in (b) of FIG. 23. In step 2208 illustrated in FIG. 22, the feature points $p_{l1}$ to $p_{l5}$, and $p_{r1}$ to $p_{r4}$ are arranged on these straight lines. At this time, the feature points are arranged such that the distances $d_{l1}$ to $d_{l4}$ and $d_{r1}$ to $d_{r3}$ are kept. With this configuration, it is possible to use the same process as the straight line even in the case of the curve.

Next, the process at the time of the lane change will be described. For example, the vehicle passes over the right white line when changing to the right lane, and the right white line becomes the left white line this time. Even during the lane change, the passing white line is captured continuously, and the captured position is changed. Therefore, for example, when changing to the right lane, the information on the right white line is transferred to the left white line. When changing to the left lane, the information on the left white line is transferred to the right white line. With this configuration, it is possible to prevent performance deterioration at the time of lane change.

The process of changing the lane will be described using a processing flow of the lane change illustrated in FIG. 24. In FIG. 24, first, in step 2401, it is determined whether the captured white line is switched. In this determination, a positional relation between the vehicle 1301 and the passing white line is suitably used. For example, in a case where the vehicle changes to the right lane, a time point when the passing white line moves left from the center of the vehicle 1301 may be determined. Further, as described above, the white line in the direction of the lane change is not possible to be captured by the side camera. Therefore, the determination is suitably performed using any one or both of the front camera 101-Fr and the rear camera 101-Rr.

In step 2402, the process is branched according to the result of step 2401. In a case where the switching is not necessary, the process illustrated in FIG. 3 is performed in step 2405. The process of FIG. 3 is the same as described above.

In step 2402, in a case where the switching is necessary, the white line information in the changing direction is transferred to a white line buffer on the opposite side in step 2403, and the white line information in the changing direction is initialized in step 2404. With this configuration, the line type of the passing white line can be determined continuously even during the lane change.

The determination process of the lane change is performed by the state transition determination unit 204.

The method of determining the line type described above may be changed within the range of the regions SL and SR according to the broken line interval, and various broken line intervals may be handled. The road type during a period when the vehicle runs is received from the car navigation system, and the broken line interval can be obtained with reference to road section line information 2501 of FIG. 25.

In this embodiment, the range of SL is referred to as the region between the cameras 101-Fr and 101-Rr, but the range may vary to handle various broken line intervals.

Figure 26:
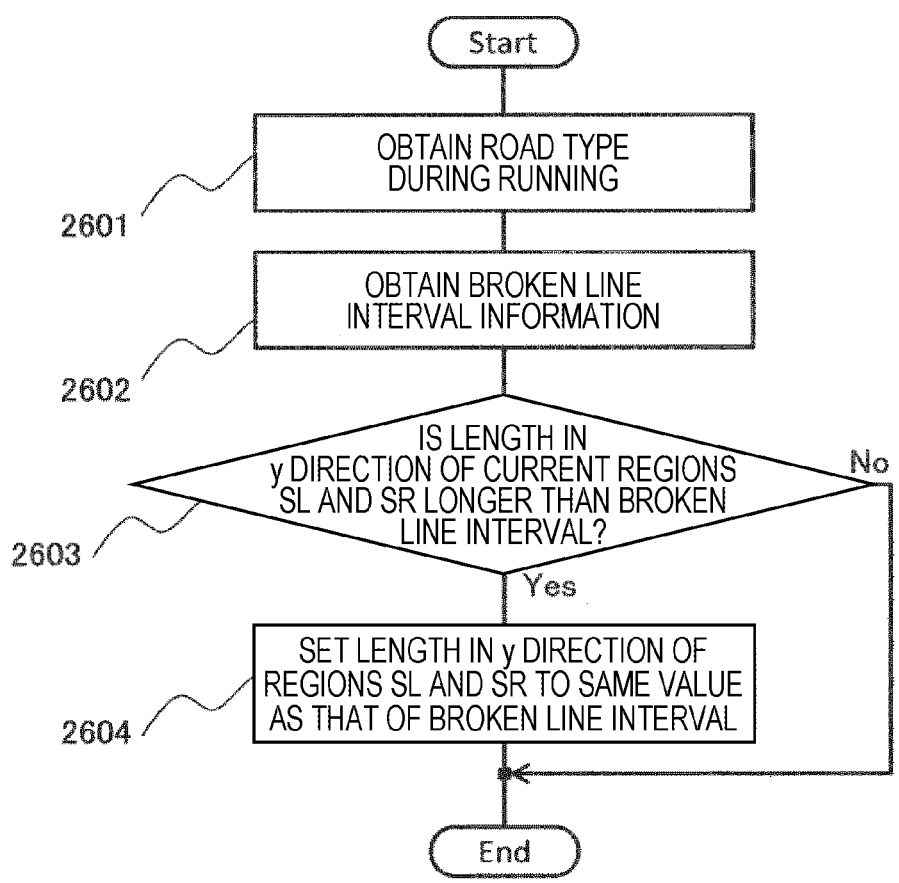
FIG. 26 is a flowchart illustrating a process of a white-line capture region according to a broken line interval.

The process is illustrated in a processing flow of FIG. 26. In FIG. 26, first, in step 2601, the road type during a period of running is obtained. Next, in step 2602, the broken line interval information is obtained on the basis of the road type. Next, in step 2603, the lengths in the y direction of the current regions SL and SR and the broken line interval obtained from the information between the broken lines. If the lengths in the y direction of the regions SL and SR are long, the process proceeds to step 2604, and the lengths in the y direction of the regions SL and SR is set to the same value as that of the broken line interval.

In addition, even though the broken lines are drawn thick in branches and joints in a high way, it is possible to set a region corresponding to the thick broken line by obtaining a running place of the vehicle 1301 from the car navigation system.

Further, a minimum number of nodes necessary for one cycle is "3" (for example, if 1401→1403→1405→1401, three nodes 1401, 1403, and 1405) to determine the broken line by the state transition model illustrated in FIG. 14. Therefore, the image frames necessary for determining the broken line are 3 frames at least.

In addition, as described above, in a case where the front camera 101-Fr is not reliable, the left side camera 101-SL and the rear camera 101-Rr are used. In a case where the rear camera 101-Rr is not reliable, the front camera 101-Fr and the left side camera 101-SL are used. In addition, in a case where the side camera 101-SL is not reliable, the front camera 101-Fr and the rear camera 101-Rr are used.

Therefore, the number of cameras having reliability necessary for determining the section line is 2 at least on one side of the vehicle.

However, if the side camera 101-SL can capture the upper side from the lower end portion of the region FL up to the lower side of the upper end portion of the region RL, the section line can be determined only by the side camera 101-SL. In this case, when the side camera 101-SL has reliability, the number of cameras necessary for determining the section line is at least one on one side of the vehicle. Therefore, the number of cameras having reliability in the whole vehicle is two.

Therefore, as another embodiment of the invention, the cameras (the right and left side cameras 101-SL and 101-SR) may be disposed only on both sides (right and left sides) of the vehicle, the reliabilities of the cameras are determined to determine the state transition of the camera having the reliability so as to determine the line type of the section line.

As described above, according to an embodiment of the invention, a plurality of image capturing units are provided on the front, rear, and sides of the vehicle. The reliability is determined on the basis of the images captured by the plurality of image capturing units (the determination of the available image capturing unit). The image captured by the image capturing unit whose detection is determined as erroneous is excluded. The feature point of the image is extracted to determine the state transition of the appearance position of the feature point, so that the type of the interval line is determined.

Therefore, it is possible to realize a section line recognition device which can determine the line type of the section line in the road surface with high accuracy.

Further, the invention is not limited to the above embodiments, but various modifications may be contained. For example, the above-described embodiments of the invention have been described in detail in a clearly understandable way, and are not necessarily limited to those having all the described configurations.

For example, the above-described example is an example in a case where the section line recognition device of the invention is mounted in the vehicle, but may also be applied even to a case where a moving object (mobile robot, etc.) which runs using the section line.

REFERENCE SIGNS LIST 101 camera
102 image processing device
103 storage device
104 CPU
105 memory
108 vehicle control unit
201 feature point extraction unit
202 coordinates transformation unit
203 camera determination unit
204 state transition determination unit
205 line type determination unit
206 common coordinates buffer memory
1301 vehicle

The invention claimed is:

1. A section line recognition device, comprising:
a plurality of cameras configured to be positioned on a moving object and comprising a front camera and a rear camera, wherein the front camera is directed toward a front direction of the moving object and captures an image of a road surface, wherein the rear camera is directed toward a rear direction of the moving object and captures an image of the road surface, and wherein the image captured by the front camera and the image captured by the rear camera do not overlap with each other;
a feature point extraction unit which extracts a feature point from the image captured by each of the front camera and the rear camera;
a coordinates transformation unit which transforms coordinates of the feature point extracted by the feature point extraction unit into coordinates of a bird's-eye view coordinate system which is common in the plurality of cameras;
a state transition determination unit which determines a feature point segment configured by a plurality of the feature points and a transition pattern of an appearance position of at least one of the feature point segments in the image captured by each of the front camera and the rear camera by using a predetermined state transition model, wherein the transition pattern is extracted from the image captured by each of the front camera and the rear camera;
a line type determination unit which determines whether a line type of a section line is a broken line or a solid line based on the transition pattern determined by the state transition determination unit; and
a camera determination unit which determines a camera of which the reliability is equal to or more than a certain value among the plurality of cameras, wherein the feature point is extracted on the basis of the image captured by the camera determined as reliable by the camera determination unit,
wherein the predetermined state transition model indicates a transition state of a node including an appearance of segments, which are a set of feature points extracted from the image captured by each of the cameras,
when the camera determination unit determines that the reliability of a first camera among the plurality of cameras is lower than the certain value, the appearance state of segments captured by the first camera is masked, and when the camera determination unit determines that the reliability of the first camera is not lower than the certain value, the appearance state of segments captured by the first camera is not masked, and
the line type determination unit ignores the masked appearance state of segments when determining the line type based on the transition pattern.

2. The section line recognition device according to claim 1, wherein the plurality of cameras includes at least two cameras, and disposed on right and left sides of the moving object.

3. The section line recognition device according to claim 2, wherein the state transition determination unit determines a lane change of the moving object using an image captured by at least one of the front camera and the rear camera.

4. The section line recognition device according to claim 1, wherein the camera determination unit determines lens contamination of the plurality of cameras, and determines that the cameras excluding a camera having a contaminated lens are available.

5. The section line recognition device according to claim 4, wherein the camera determination unit specifies a camera which extracts the feature point from a portion other than the section line using a positional relation of the feature points extracted from the images captured by the plurality of cameras, and determines that the cameras other than the specified camera are available.

6. The section line recognition device according to claim 4, wherein the camera determination unit calculates reliability of the plurality of cameras using a positional relation of the feature points extracted from the images captured by the plurality of cameras, specifies a camera of which the calculated reliability is equal to or less than a certain value, and determines that the cameras other than the specified camera are available.

7. A section line recognition device, comprising:
a plurality of cameras configured to be positioned on a moving object and comprising a front camera and a rear camera, wherein the front camera is directed toward a front direction of the moving object and captures an image of a road surface, wherein the rear camera is directed toward a rear direction of the moving object and captures an image of the road surface, and wherein the image captured by the front camera and the image captured by the rear camera do not overlap with each other;

a feature point extraction unit which extracts a feature point from the image captured by each of the front camera and the rear camera;

a coordinates transformation unit which transforms coordinates of the feature point extracted by the feature point extraction unit into coordinates of a bird's-eye view coordinate system which is common in the plurality of cameras;

a state transition determination unit which determines a feature point segment configured by a plurality of the feature points and a transition pattern of an appearance position of at least one of the feature point segments in the image captured by each of the front camera and the rear camera by using a predetermined state transition model, wherein the transition pattern is extracted from the image captured by each of the front camera and the rear camera;

a line type determination unit which determines a line type of a section line on the road surface based on the transition pattern determined by the state transition determination unit; and a camera determination unit which determines a camera of which the reliability is equal to or more than a certain value among the plurality of cameras, wherein the feature point is extracted on the basis of the image captured by the camera determined as reliable by the camera determination unit, wherein the predetermined state transition model indicates a transition state of a node including an appearance of segments, which are a set of feature points extracted from the image captured by each of the cameras, when the camera determination unit determines that the reliability of a first camera among the plurality of cameras is lower than the certain value, the appearance state of segments captured by the first camera is masked, and when the camera determination unit determines that the reliability of the first camera is not lower than the certain value, the appearance state of segments captured by the first camera is not masked, and the line type determination unit ignores the masked appearance state of segments when determining the line type based on the transition pattern.

8. The section line recognition device according to claim 7, wherein the plurality of cameras includes at least two cameras, and disposed on right and left sides of the moving object.

9. The section line recognition device according to claim 8, wherein the state transition determination unit determines a lane change of the moving object using an image captured by at least one of the front camera and the rear camera.

10. The section line recognition device according to claim 7, wherein the camera determination unit determines lens contamination of the plurality of cameras, and determines that the cameras excluding a camera having a contaminated lens are available.

11. The section line recognition device according to claim 10, wherein the camera determination unit specifies a camera which extracts the feature point from a portion other than the section line using a positional relation of the feature points extracted from the images captured by the plurality of cameras, and determines that the cameras other than the specified camera are available.

12. The section line recognition device according to claim 11, wherein the camera determination unit calculates reliability of the plurality of cameras using a positional relation of the feature points extracted from the images captured by the plurality of cameras, specifies a camera of which the calculated reliability is equal to or less than a certain value, and determines that the cameras other than the specified camera are available.

13. The section line recognition device of claim 7, wherein the line type determination unit is configured to determine whether the line type is a broken line or a solid line.

* * * * *